US012638964B2

(12) United States Patent (10) Patent No.: US 12,638,964 B2
Chung et al. (45) Date of Patent: May 26, 2026

(54) ELECTRONIC DEVICE CHANGING CONFIGURATION OF SCREEN ACCORDING TO CHANGE IN SIZE OF AT LEAST ONE ICON AND METHOD FOR CONTROLLING THE SAME

(71) Applicant: Samsung Electronics Co., Ltd., Suwon-si (KR)

(72) Inventors: Jinkyo Chung, Suwon-si (KR); Dongkyun Kang, Suwon-si (KR); Eunhae Park, Suwon-si (KR); Eunsun Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 18/442,502

(22) Filed: Feb. 15, 2024

(65) Prior Publication Data

US 2024/0281126 A1 Aug. 22, 2024

Related U.S. Application Data

(63) Continuation of application No. PCT/KR2024/001876, filed on Feb. 8, 2024.

(30) Foreign Application Priority Data

| Feb. 17, 2023 | (KR) | .......................... | 10-2023-0021344 |
| Apr. 3, 2023 | (KR) | .......................... | 10-2023-0043723 |
| May 2, 2023 | (KR) | ....................... | 10-2023-00571726 |

(51) Int. Cl.
G06F 3/04845 (2022.01)
G06F 3/04817 (2022.01)
G06F 3/0488 (2022.01)

(52) U.S. Cl.
CPC ........ G06F 3/04845 (2013.01); G06F 3/0488 (2013.01); G06F 3/04817 (2013.01)

(58) Field of Classification Search
CPC . G06F 3/04845; G06F 3/0488; G06F 3/04817
(Continued)

(56) References Cited

U.S. PATENT DOCUMENTS 10,509,537 B2 12/2019 Yoshida
2009/0094562 A1 4/2009 Jeong et al.
(Continued)

FOREIGN PATENT DOCUMENTS

CN 111966251 A 11/2020
CN 113407290 A 9/2021
(Continued)

OTHER PUBLICATIONS

Search Report and Written Opinion dated May 13, 2024 issued in International Patent Application No. PCT/KR2024/001876.
(Continued)

*Primary Examiner* — Daniel Samwel
(74) *Attorney, Agent, or Firm* — Nixon & Vanderhye P.C.

(57) ABSTRACT

Disclosed are an electronic device changing a configuration of a screen according to resizing at least one icon and a method for controlling the same. An electronic device according to an embodiment of the disclosure may comprise: a touchscreen display and at least one processor comprising processing circuitry. At least one processor, individually and/or collectively, may be configured to cause the electronic device to: display, on the touchscreen display, a first screen including a plurality of visual objects, obtain a first input to at least one visual object among the visual objects, through the touchscreen display, and shrink and display other visual objects among the plurality of visual objects while enlarging the at least one visual object, (Continued)

1x1 → 3x3 through the touchscreen display, based on obtaining the first input.

20 Claims, 31 Drawing Sheets

(58) Field of Classification Search
USPC ................................................... 715/700–866
See application file for complete search history.

(56)                    References Cited

U.S. PATENT DOCUMENTS

| | | | |
|---|---|---|---|
| 2012/0124513 A1 | 5/2012 | Shim | |
| 2012/0162261 A1 | 6/2012 | Kim et al. | |
| 2013/0047119 A1 | 2/2013 | Lee | |
| 2013/0135228 A1 | 5/2013 | Won et al. | |
| 2013/0139109 A1* | 5/2013 | Kim | G06F 3/04817 |
| | | | 715/835 |
| 2013/0155116 A1 | 6/2013 | Paretti et al. | |
| 2015/0128092 A1 | 5/2015 | Lee | |
| 2015/0350414 A1 | 12/2015 | Park et al. | |
| 2016/0259528 A1* | 9/2016 | Foss | G06F 3/0485 |
| 2018/0081398 A1 | 3/2018 | Shin | |
| 2018/0188951 A1* | 7/2018 | Kim | G06F 3/016 |
| 2018/0217733 A1 | 8/2018 | Ueno | |
| 2019/0179521 A1 | 6/2019 | Han et al. | |
| 2020/0319794 A1* | 10/2020 | Eun | G06F 3/0414 |
| 2023/0038036 A1 | 2/2023 | Choi et al. | |
| 2023/0077467 A1 | 3/2023 | Xu | |
| 2023/0259252 A1* | 8/2023 | Alonso Ruiz | H04N 21/42224 |
| | | | 715/767 |
| 2024/0143127 A1 | 5/2024 | Wu | |

FOREIGN PATENT DOCUMENTS

| | | |
|---|---|---|
| JP | 6264293 | 1/2018 |
| KR | 10-2008-0077798 | 8/2008 |
| KR | 10-2010-0023637 | 3/2010 |
| KR | 20120053335 A | 5/2012 |
| KR | 20130052753 A | 5/2013 |
| KR | 10-1281448 | 7/2013 |
| KR | 10-1740439 | 5/2017 |
| KR | 20180031373 A | 3/2018 |
| KR | 10-2204554 | 1/2021 |
| KR | 10-2023-0022047 | 2/2023 |

OTHER PUBLICATIONS

Extended European Search Report dated Dec. 10, 2025 for EP Application No. 24757131.8.

* cited by examiner

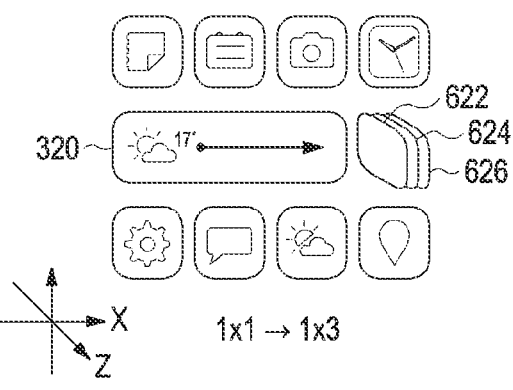
1x1 → 1x3
FIG. 7A
1x1 → 1x4
FIG. 7B
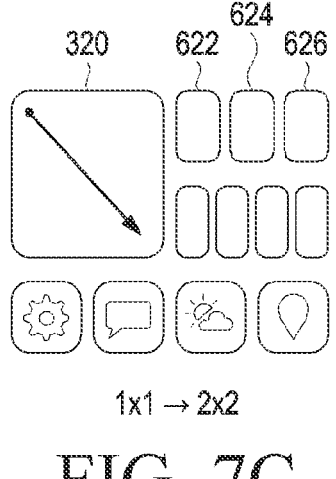
1x1 → 2x2
FIG. 7C
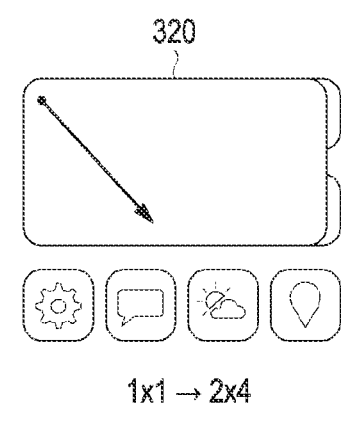
1x1 → 2x4
FIG. 7D
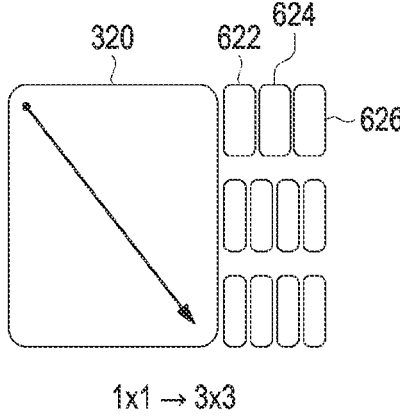
1x1 → 3x3
FIG. 7E
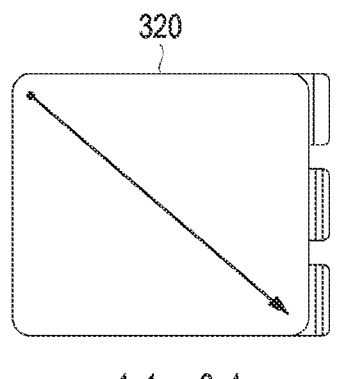
1x1 → 3x4
FIG. 7F Mobile Home                    XR Home

ELECTRONIC DEVICE CHANGING CONFIGURATION OF SCREEN ACCORDING TO CHANGE IN SIZE OF AT LEAST ONE ICON AND METHOD FOR CONTROLLING THE SAME

CROSS-REFERENCE TO RELATED APPLICATIONS

This application is a continuation of International Application No. PCT/KR2024/001876 designating the United States, filed on Feb. 8, 2024, in the Korean Intellectual Property Receiving Office and claiming priority to Korean Patent Application Nos. 10-2023-0021344, filed on Feb. 17, 2023, 10-2023-0043723, filed on Apr. 3, 2023, and 10-2023-0056126, filed on May 2, 2023, in the Korean Intellectual Property Office, the disclosures of each of which are incorporated by reference herein in their entireties.

BACKGROUND

Field

The disclosure relates to an electronic device changing the configuration of a screen according to a change in the size of at least one icon and a method for controlling the same.

Description of Related Art

More and more services and additional features are being provided via electronic devices, e.g., PCs or smartphones. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

When providing a function to change the shape of an icon according to the user's input to at least one icon, an electronic device according to the prior art overlaps and displays other surrounding icons according to the change in the shape of the at least one icon. Accordingly, the electronic device according to the prior art may have difficulty in providing the user with more various pieces of information provided through the screen of a portable electronic device which has a relatively small screen.

SUMMARY

Embodiments of the disclosure may provide an electronic device that may provide the user with more various pieces of information provided through the screen of a portable electronic device which has a relatively small screen by changing and displaying the shape of other icons disposed around an icon whose shape is changed when providing a function of changing the shape of an icon according to the user's input to at least one icon.

Embodiments of the disclosure may provide an electronic device that may display at least one element (e.g., icon) designated by the user without changing the position of the element by changing and displaying the shape of other icons disposed around an icon whose shape is changed when providing a function of changing the shape of an icon according to the user's input to at least one icon.

An electronic device according to an example embodiment of the disclosure may comprise: a touchscreen display and at least one processor, comprising processing circuitry, individually and/or collectively, configured to: control the touchscreen display to display, on the touchscreen display, a first screen including a plurality of visual objects, obtain a first input to at least one visual object among the visual objects, through the touchscreen display, and shrink and display some other visual objects among the plurality of visual objects while enlarging the at least one visual object, through the touchscreen display, based on obtaining the first input.

A method for controlling an electronic device according to an example embodiment of the disclosure may comprise: displaying, on a touchscreen display of the electronic device, a first screen including a plurality of visual objects, obtaining a first input to at least one visual object among the plurality visual objects, through the touchscreen display, and shrinking and displaying some other visual objects among the plurality of visual objects while enlarging the at least one visual object, through the touchscreen display, based on obtaining the first input.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 7A, 7B, 7C, 7D, 7E and 7F are diagrams illustrating an example function or operation in which an electronic device reconfigures a screen by changing the shape of surrounding visual objects (e.g., icons) according to a change in the shape of at least one visual object (e.g., icon) from a user interface perspective according to various embodiments;

DETAILED DESCRIPTION

Figure 1:
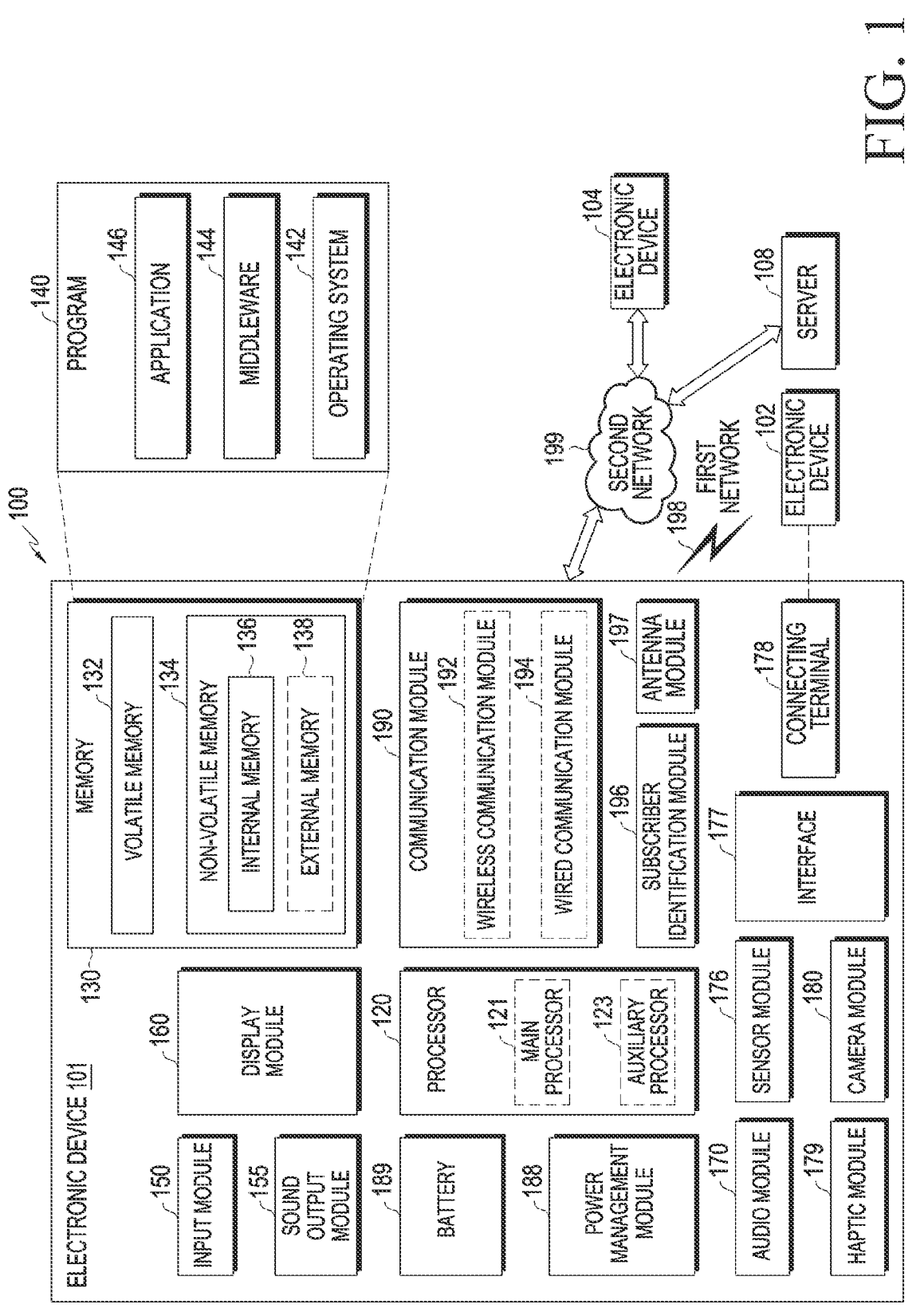
FIG. 1 is a diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
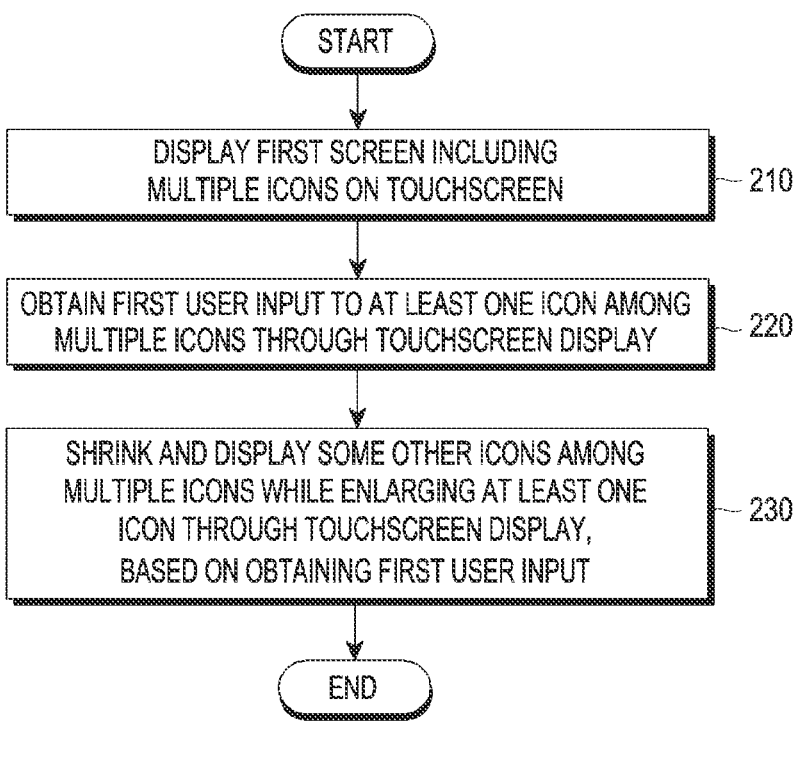
FIG. 2 is a flowchart illustrating an example operation in which an electronic device reconfigures a home screen according to a change in the shape of at least one visual object according to various embodiments.

FIG. 2 is a flowchart illustrating an example operation in which an electronic device 101 reconfigures a home screen according to a change in the shape of at least one visual object (e.g., the first icon 310) according to various embodiments. The visual object mentioned herein may include an object such as an icon, an icon in an extended state, and/or a widget.

Referring to FIG. 2, in operation 210, the electronic device 101 according to an embodiment of the disclosure may display a first screen including a plurality of icons on a touchscreen display (e.g., the display module 160 of FIG. 1).

In operation 220, the electronic device 101 according to an embodiment of the disclosure may obtain a first input (e.g., user input) to at least one icon among a plurality of icons. At least one icon (e.g., the first icon 310) among the plurality of icons according to an embodiment of the disclosure may be reshaped (e.g., enlarged) according to a user input to at least one icon (e.g., the first icon 310), while other icons may be shrunk while enlarging the at least one icon through the touchscreen display based on receiving the first user input in operation 230.

FIGS. 3A, 3B, 3C, 3D and 3E are diagrams illustrating an example function or operation in which an electronic device changes the shape of at least one icons according to the user's input according to various embodiments.

Figure 3A:
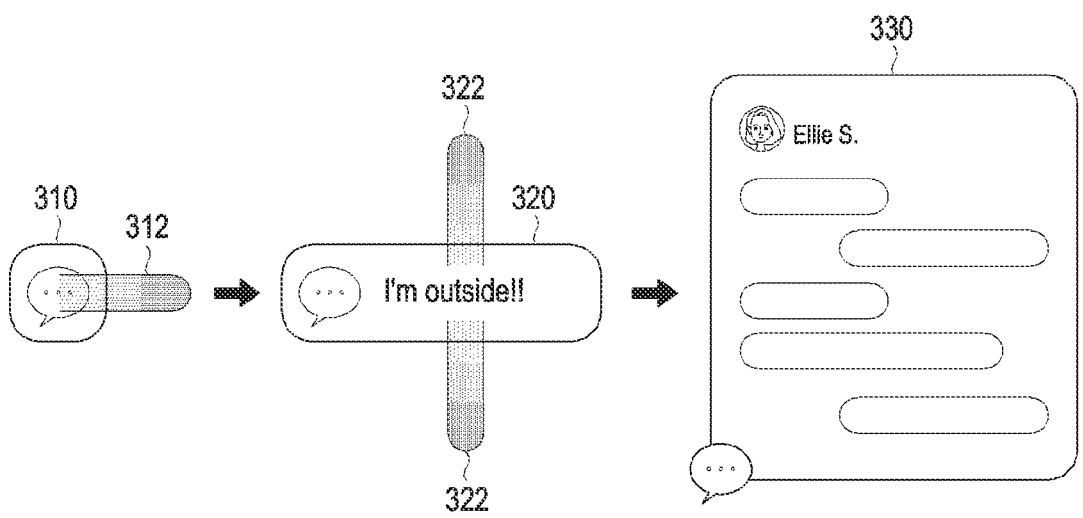
FIGS. 3A, 3B, 3C, 3D and 3E are diagrams illustrating a function or operation in which an electronic device changes the shape of at least one visual object (e.g., icon) according to the user's input according to various embodiments.

Referring to FIG. 3A, the electronic device 101 according to an embodiment of the disclosure may detect a first user input 312 (e.g., a swipe gesture) to the first icon 310. When it is designated previously or by the user that the first icon 310 is reshaped according to the first user input 312, the electronic device 101 according to an embodiment of the disclosure may reshape the first icon 310 and display the reshaped icon (e.g., the second icon 320) as illustrated in 3A. The electronic device 101 according to an embodiment of the disclosure may display information about an event related to the second icon 320 inside the second icon 320. For example, when the second icon 320 according to an embodiment of the disclosure is a shortcut icon (e.g., an icon for executing a designated application) corresponding to a message application, the electronic device 101 may display the content of the most recently received message inside the second icon 320. The electronic device 101 according to an embodiment of the disclosure may detect a user input (e.g., a swipe gesture as the second user input 322) to the second icon 320. The electronic device 101 according to an embodiment of the disclosure may display a third icon 330 which is a reshaped icon of the second icon 320, based on the second user input 322 to the second icon 320. The third icon 330 according to an embodiment of the disclosure may include a chat message window including a visual object indicating a message application and a message transmission/reception record with a specific counterpart.

Figure 3B:
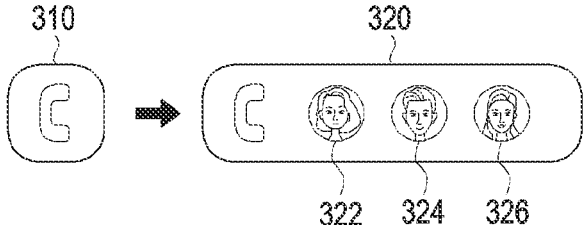

Referring to FIG. 3B, when a user input to the first icon 310 corresponding to a call application is obtained, the electronic device according to an embodiment of the disclosure may reshape the first icon 310 to display at least one visual object (e.g., the first visual object 322, the second visual object 324, or the third visual object 326) indicating the counterpart to whom a call was recently made.

Figure 3C:
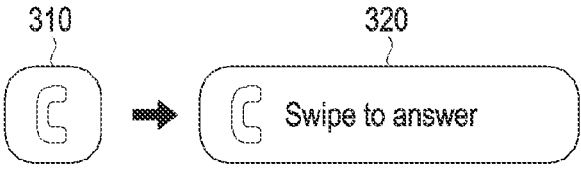

Referring to FIG. 3C, when a user input to the first icon 310 corresponding to the call application is obtained while a call event is occurring, the electronic device 101 according to an embodiment of the disclosure may display a second icon 320 including a designated message.

Figure 3D:
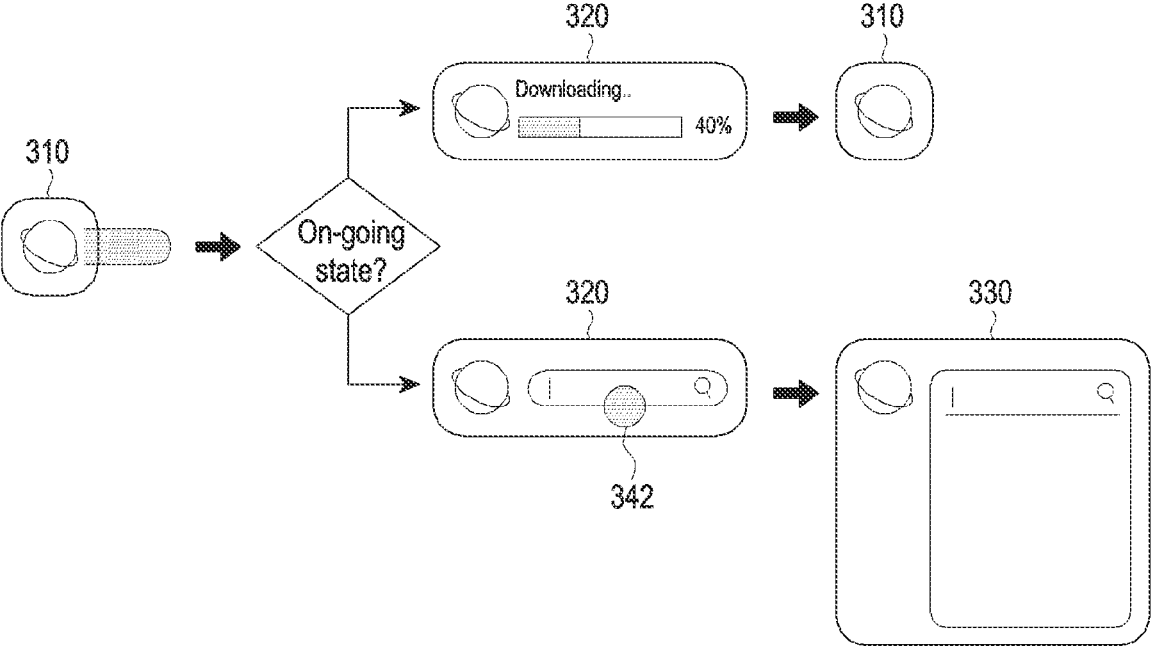

Referring to FIG. 3D, when a user input to the first icon 310 corresponding to an Internet application is obtained, the electronic device 101 according to an embodiment of the disclosure may display the second icon 320. When a user input to the first icon 310 is detected while an event (e.g., a download event) related to the Internet application is occurring, the electronic device 101 according to an embodiment of the disclosure may display information related to the download event inside the second icon 320. The electronic device 101 according to an embodiment of the disclosure may display the first icon 310 when a designated time elapses after displaying the second icon 320. The electronic device 101 according to an embodiment of the disclosure may display the second icon 320 when a user input to the first icon 310 corresponding to the Internet application is obtained. When a user input to the first icon 310 is detected while an event (e.g., a download event) related to the Internet application is not occurring, the electronic device 101 according to an embodiment of the disclosure may display a search window inside the second icon 320. If a user input (e.g., the third user input 342) to the second icon 320 is obtained, the electronic device 101 according to an embodiment of the disclosure may display a search window in an extended state, inside the third icon 330 which is a reshaped icon of the second icon 320.

Figure 3E:
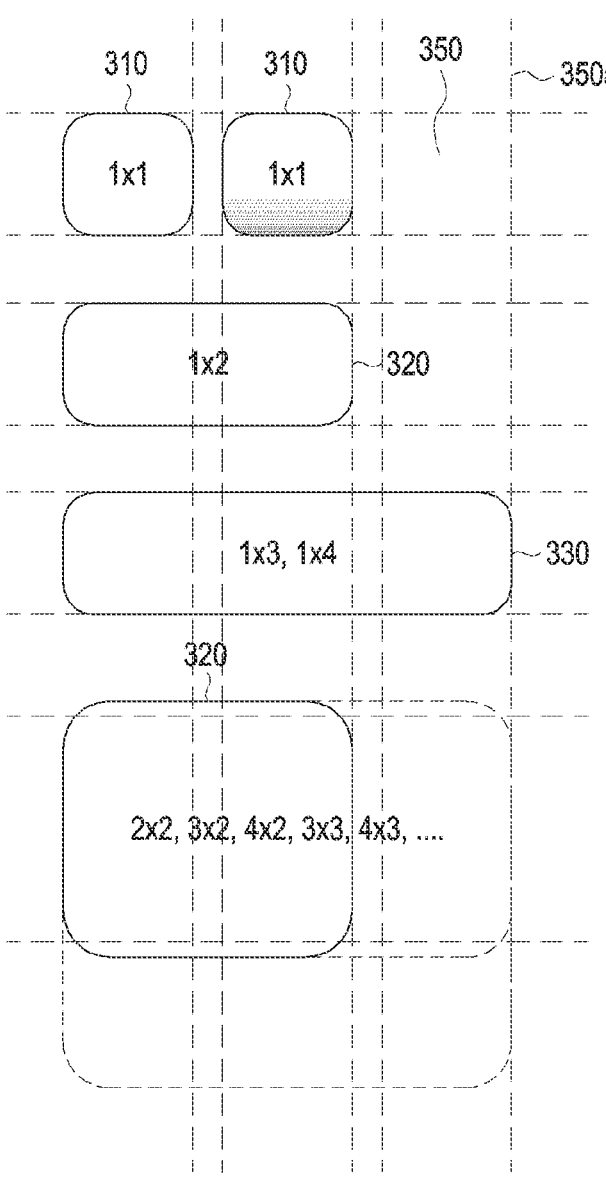

Referring to FIG. 3E, the electronic device 101 according to an embodiment of the disclosure may display the first icon 310. When an event related to the first icon 310 occurs, the electronic device 101 according to an embodiment of the disclosure may display a designated visual effect inside the first icon 310. The electronic device 101 according to an embodiment of the disclosure may display the second icon 320 according to a user input to the first icon 310. The electronic device 101 according to an embodiment of the disclosure may display the third icon 330 which is a reshaped icon of the second icon 320 according to the user input to the second icon 320. If the border of at least one icon (e.g., the first icon 310) approaches a virtual line 350a dividing a virtual grid area 350, the electronic device may enlarge or shrink at least one icon while having a visual effect (which may be referred to as a "magnetic effect" as an example for convenience in the disclosure) of contacting the virtual line 350a. The magnetic effect may apply, with one grid area 350 divided into a plurality of areas according to an embodiment of the disclosure. At least one icon according to an embodiment of the disclosure may be enlarged or shrunken regardless of the size of the grid area 350. In this case, the size of the icon positioned around the at least one icon may be resized according to the change in the size of the at least one icon as illustrated an described in greater detail below with reference to FIG. 6B or the like.

Figure 4:
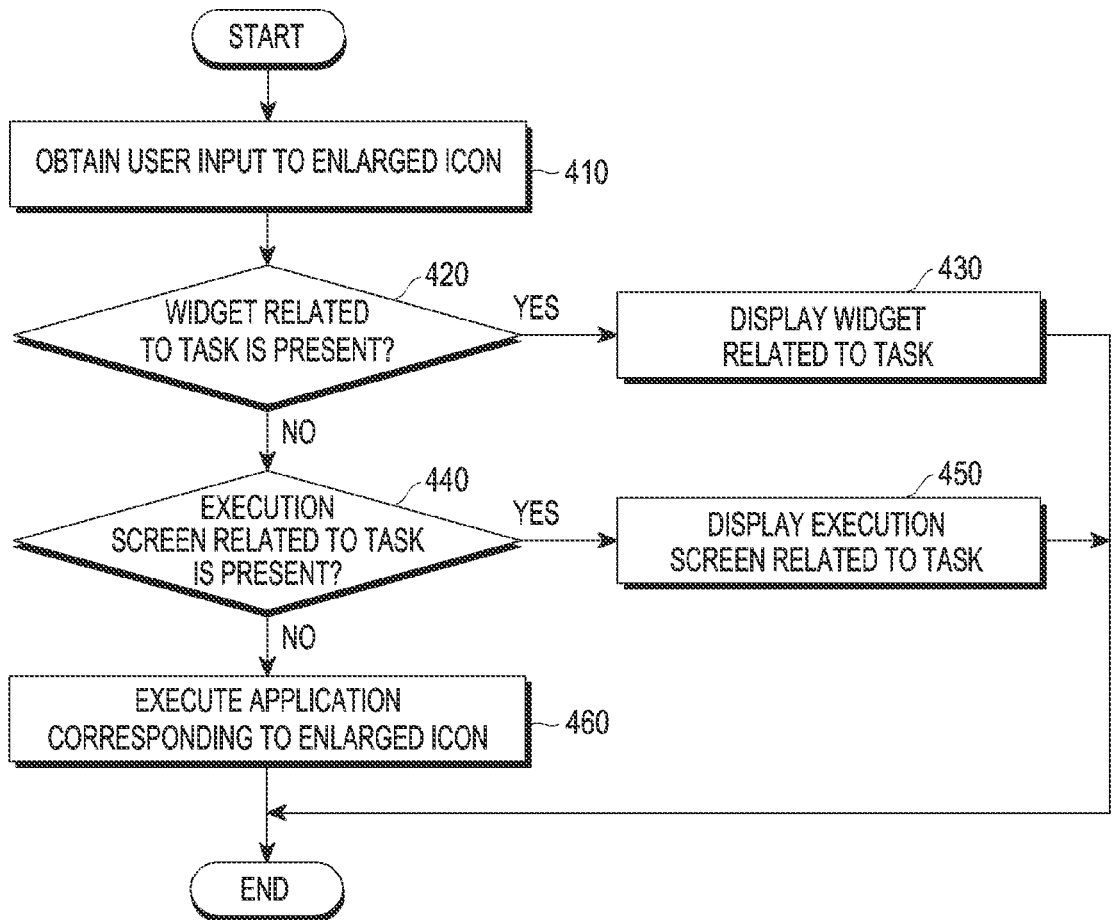
FIG. 4 is a flowchart illustrating an example operation in which an electronic device displays an execution screen of a widget and/or an application corresponding to at least one visual object (e.g., icon) according to the user's input according to various embodiments.
Figure 5A:
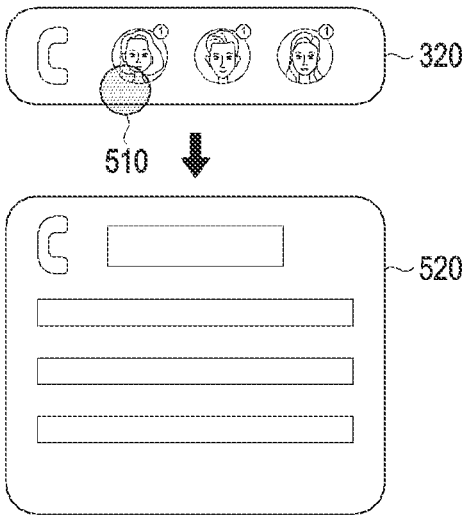
FIGS. 5A and 5B are diagrams illustrating an example function or operation described in connection with FIG. 4 from a user interface perspective according to various embodiments.
Figure 5B:
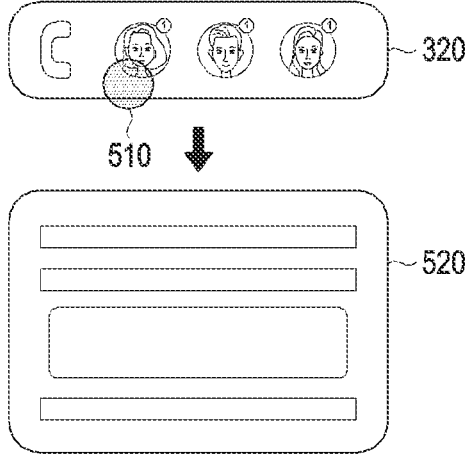

FIG. 4 is a flowchart illustrating an example operation in which an electronic device 101 displays an execution screen of a widget and/or an application corresponding to at least one icon (e.g., the second icon 320) according to the user's input according to various embodiments. FIGS. 5A and 5B are diagrams illustrating the example function or operation described in connection with FIG. 4 from a user interface perspective according to various embodiments.

In operation 410, the electronic device 101 according to an embodiment of the disclosure may obtain a user input to an enlarged icon (e.g., the second icon 320). A visual effect (e.g., Information about the counterpart who has made a missing call) related to a designated task (e.g., missing call) may be displayed inside the second icon 320 according to an embodiment of the disclosure.

In operation 420, the electronic device 101 according to an embodiment of the disclosure may determine whether there is a widget related to the task. When there is a widget related to the task, the electronic device 101 according to an embodiment of the disclosure may display the widget related to the task (e.g., the first widget 520) in operation 430. The electronic device 101 according to an embodiment of the disclosure may obtain a user input (e.g., a long touch gesture as the fourth user input 510) to at least one visual object displayed in the enlarged icon (e.g., the second icon 320). The electronic device 101 according to an embodiment of the disclosure may determine whether a widget related to a designated task corresponding to the fourth user input 510 is designated. The electronic device 101 according to an embodiment of the disclosure may display a designated widget when the widget related to the designated task corresponding to the fourth user input 510 is designated.

In operation 440, the electronic device 101 according to an embodiment of the disclosure may determine whether there is an execution screen related to the task (e.g., a shrunken execution screen of the execution screen of the call application). When there is an execution screen related to the task, the electronic device 101 according to an embodiment of the disclosure may display the execution screen related to the task in operation 450. When there is an execution screen (e.g., the first screen 520) associated with a designated task corresponding to the fourth user input 510, the electronic device 101 according to an embodiment of the disclosure may display the designated screen as illustrated in FIG. 5B. When there is no widget and screen related to the designated task, the electronic device 101 according to an embodiment of the disclosure may execute an application corresponding to an enlarged icon (e.g., the second icon 320) in operation 460. In this case, the electronic device 101 according to an embodiment of the disclosure may display an execution screen of a call application as a full screen. When there is not a priority task (e.g., display of information about a missing call, configured to be displayed according to a user input) designated previously or by the user, the electronic device 101 according to an embodiment of the disclosure may display information about a frequently used task inside the second icon 320.

Referring back to FIG. 2, the electronic device 101 according to an embodiment of the disclosure may shrink and display some other icons among the plurality of icons while enlarging at least one icon based on obtaining the first user input in operation 230.

Figure 6A:
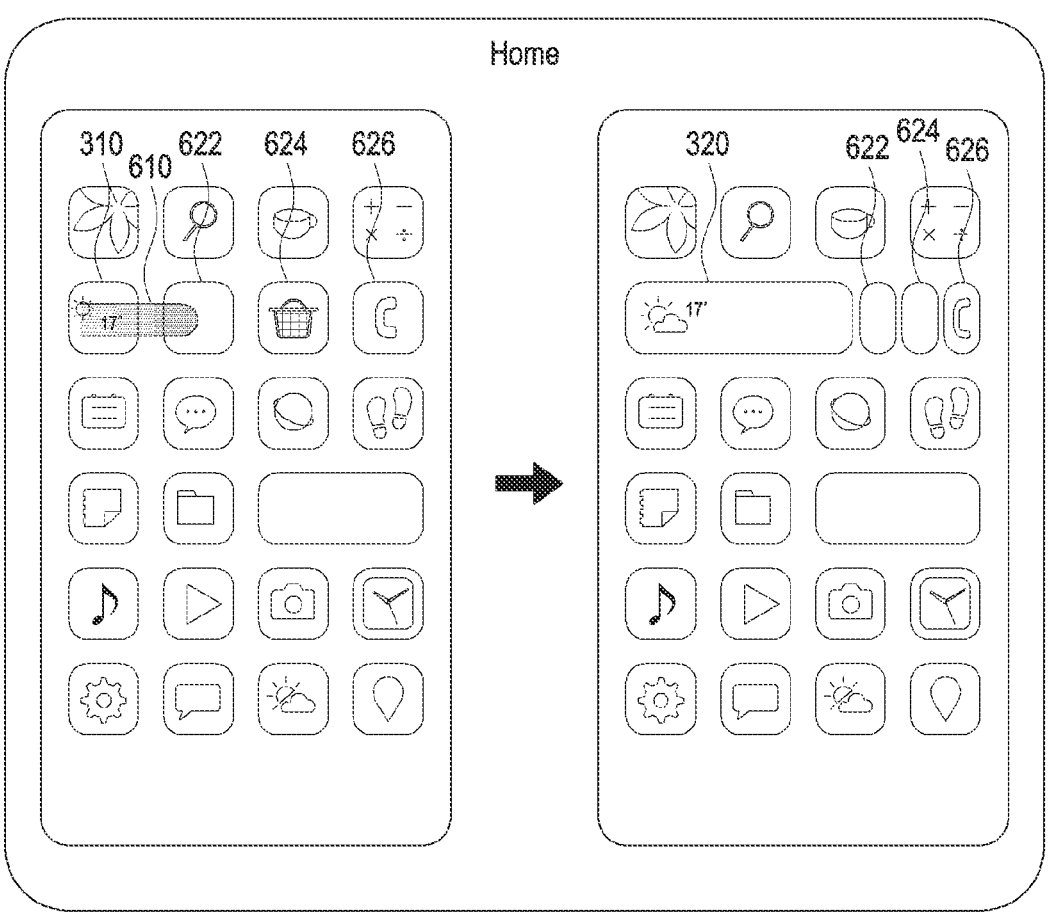
FIG. 6A is diagram illustrating an example function or operation in which screen reconfiguration is performed on a home screen according to various embodiments.
Figure 6B:
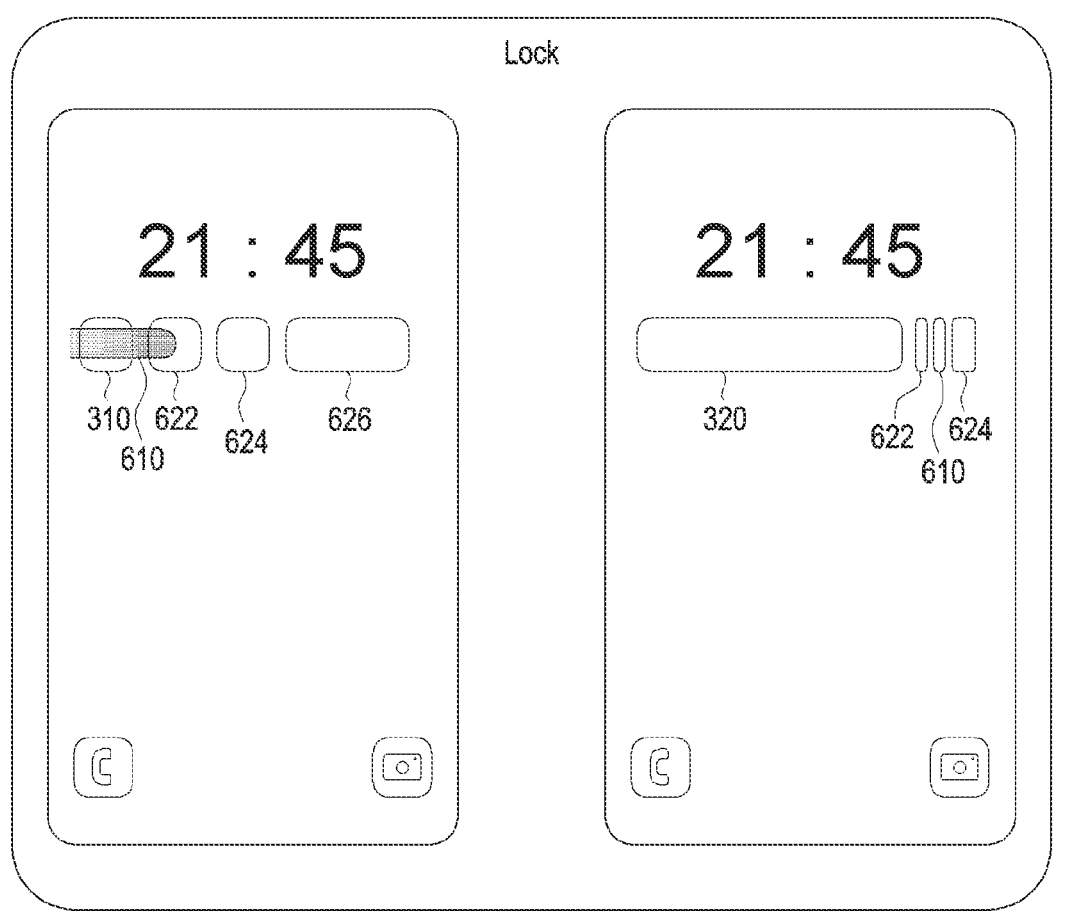
FIG. 6B is a diagram illustrating an example function or operation in which screen reconfiguration is performed on a lock screen according to various embodiments.

FIG. 6A is a diagram illustrating an example function or operation in which screen reconfiguration is performed on a home screen according to various embodiments. FIG. 6B is a diagram illustrating an example function or operation in which screen reconfiguration is performed on a lock screen according to various embodiments. FIGS. 7A, 7B, 7C, 7D, 7E and 7F are diagrams illustrating an example function or operation in which an electronic device reconfigures a screen by changing the shape of surrounding icons according to a change in the shape of at least one icon from a user interface perspective according to various embodiments.

Referring to FIG. 6A, the electronic device 101 according to an embodiment of the disclosure may display the second icon 320 based on a user input (e.g., a swipe gesture as the sixth user input 610) to the first icon 320. In this case, the electronic device 101 according to an embodiment of the disclosure may reshape (e.g., shrink) at least one icon (e.g., the fourth icon 622, the fifth icon 624, or the sixth icon 626) positioned in a direction (e.g., a direction corresponding to the horizontal component of the user input when the user input is an input in a diagonal direction as illustrated in FIG. 7C) corresponding to the direction of the sixth user input 610. The disclosure illustrates an embodiment in which at least one icon is extended in a horizontal direction, but the various embodiments described in the disclosure may be equally applied to the case in which the at least one icon is extended in a vertical direction.

Referring to FIG. 6B, the electronic device 101 according to an embodiment of the disclosure may display the second icon 320 based on a user input (e.g., a swipe gesture as the sixth user input 610) to the first icon 320. In this case, the electronic device 101 according to an embodiment of the disclosure may reshape (e.g., shrink) at least one icon (e.g., the fourth icon 622, the fifth icon 624, or the sixth icon 626) positioned in a direction corresponding to the direction of the sixth user input 610 on the lock screen. As illustrated in FIGS. 7A and 7B, the electronic device 101 according to an embodiment of the disclosure may rotate and display at least one icon (e.g., the fourth icon 622, the fifth icon 624, or the sixth icon 626) in the Z-axis direction based on the display of the second icon 320. As illustrated in FIGS. 7C, 7D, 7E, and 7F, the electronic device 101 according to an embodiment of the disclosure may resize and display at least one icon (e.g., the fourth icon 622, the fifth icon 624, or the sixth icon 626) without rotating, based on the display of the second icon 320. According to an embodiment of the disclosure, as illustrated in FIG. 7D, according to the display of the second icon 320, at least one shrunken icon (e.g., the fourth icon 622, the fifth icon 624, or the sixth icon 626) may be displayed to overlap at least a portion of the second icon 320. The electronic device 101 according to an embodiment of the disclosure may display the inside of at least shrunken one icon (e.g., the fourth icon 622, the fifth icon 624, or the sixth icon 626) in designated colors that are distinct from each other.

Figure 8:
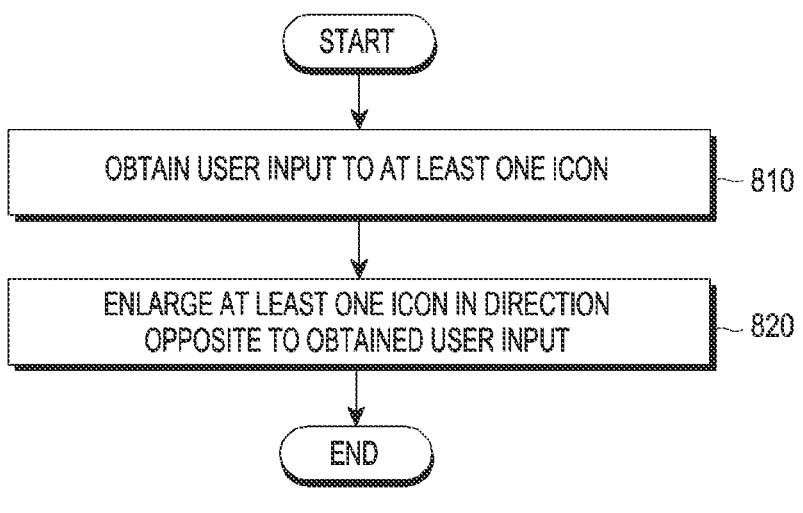
FIG. 8 is a flowchart illustrating an example operation of changing the shape of at least one visual object (e.g., icon) when obtaining a user input in a direction opposite to an extending direction of at least one visual object (e.g., icon) according to various embodiments.
Figure 9:
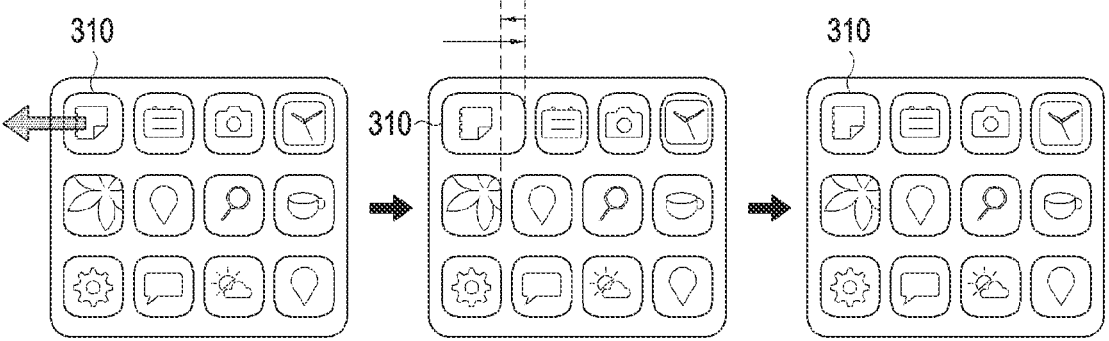
FIG. 9 is a diagram illustrating the example function or operation illustrated in FIG. 8 from a user interface perspective according to various embodiments.

FIG. 8 is a flowchart illustrating an example operation of changing the shape of at least one icon (e.g., the first icon 310) when obtaining a user input in a direction opposite to an extending direction of at least one icon (e.g., the first icon 310) according to various embodiments. FIG. 9 is a diagram illustrating the example function or operation illustrated in FIG. 8 from a user interface perspective according to various embodiments.

Referring to FIG. 8, in operation 810, the electronic device 101 according to an embodiment of the disclosure may obtain a user input to at least one icon. The user input according to an embodiment of the disclosure may include a user input in a direction opposite to the direction in which the first icon 310 is configured to be extended or in a direction in which the first icon 310 may no longer be extended (e.g., when the first icon 310 is displayed near the edge of the touchscreen display).

In operation 820, the electronic device 101 according to an embodiment of the disclosure may enlarge at least one icon in a direction opposite to the user input obtained in operation 810. As illustrated in FIG. 9, the electronic device 101 according to an embodiment of the disclosure may temporarily enlarge the first icon 310 in a direction in which the first icon 310 is extendable, and then may restore and display the first icon 310 to its original size.

Figure 10A:
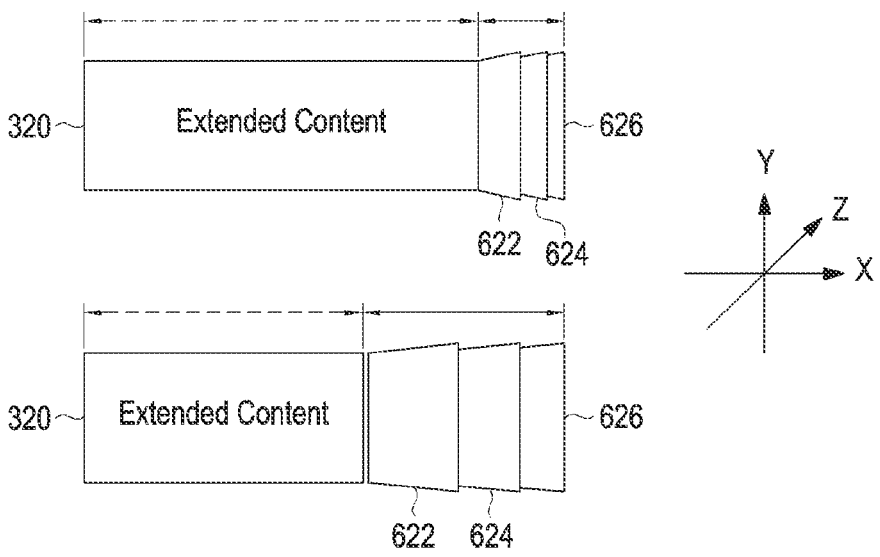
FIGS. 10A, 10B and 10C are diagrams illustrating an example function or operation in which an electronic device reconfigures surrounding visual objects (e.g., icons) according to a change in the shape of at least one visual object (e.g., icon) according to various embodiments.
Figure 10B:
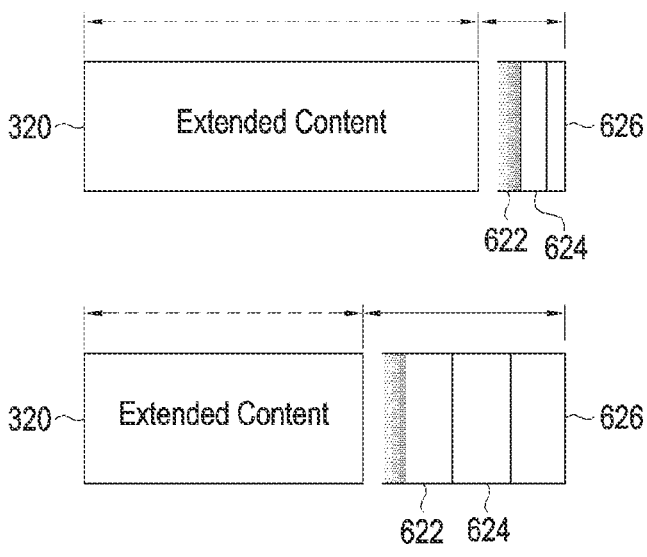
Figure 10C:
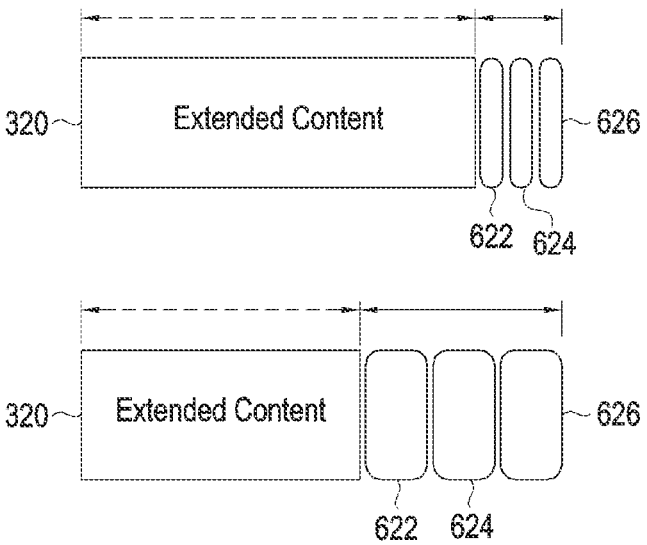

FIGS. 10A, 10B and 10C are diagrams illustrating an example function or operation in which an electronic device 101 reconfigures surrounding icons according to a change in the shape of at least one icon according to various embodiments.

As illustrated in FIG. 10A, the electronic device 101 according to an embodiment of the disclosure may rotate and display at least one icon (e.g., the fourth icon 622, the fifth icon 624, or the sixth icon 626) in the Z-axis direction based on the display of the second icon 320. As illustrated in FIG. 10B, the electronic device 101 according to an embodiment of the disclosure may overlap and display at least one icon (e.g., the fourth icon 622, the fifth icon 624, or the sixth icon 626) without rotating and displaying the at least one icon (e.g., the fourth icon 622, the fifth icon 624, or the sixth icon 626) in the Z-axis direction based on the display of the second icon 320. As illustrated in FIG. 10C, the electronic device 101 according to an embodiment of the disclosure may shrink and display at least one icon (e.g., the fourth icon 622, the fifth icon 624, or the sixth icon 626) not to overlap each other, without rotating and displaying the at least one icon (e.g., the fourth icon 622, the fifth icon 624, or the sixth icon 626) in the Z-axis direction based on the display of the second icon 320.

Figure 11:
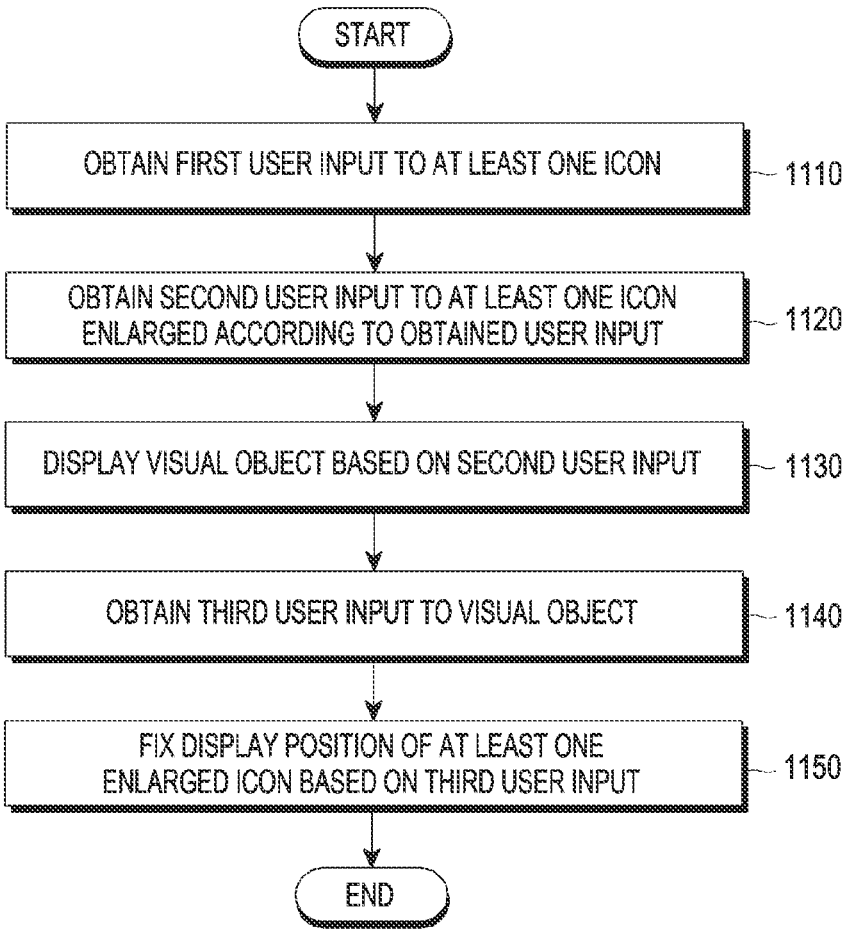
FIG. 11 is a flowchart illustrating an example operation in which an electronic device displays a visual object (e.g., icon) whose shape is changed according to the user's input, with the display position of the visual object fixed according to various embodiments.
Figure 12:
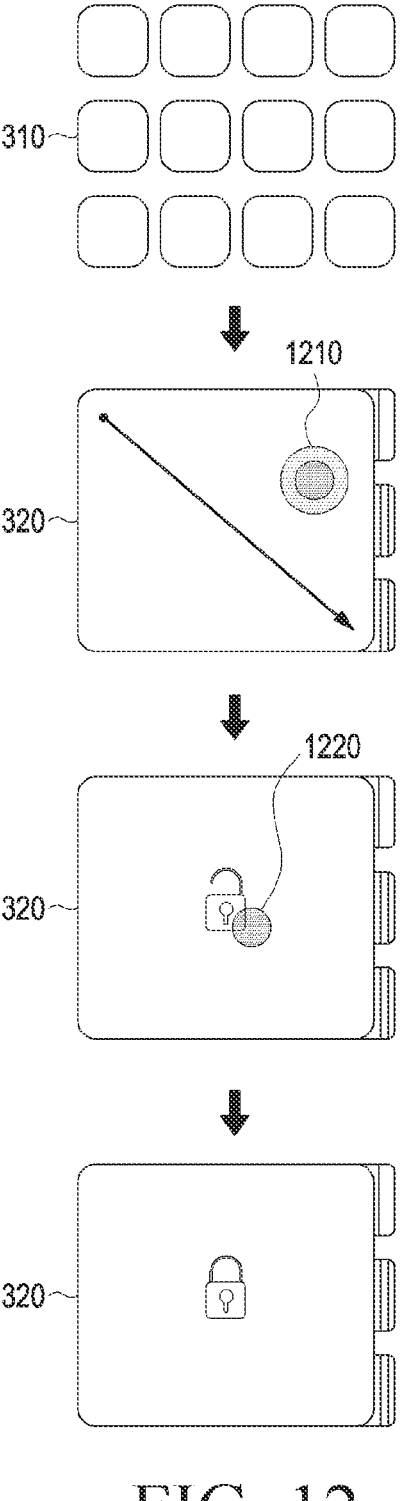
FIG. 12 is a diagram illustrating the example function or operation illustrated in FIG. 11 from a user interface perspective according to various embodiments.

FIG. 11 is a flowchart illustrating an example operation in which an electronic device 101 displays an icon whose shape is changed according to the user's input, with the display position of the visual object fixed according to various embodiments. FIG. 12 is a diagram illustrating the example function or operation illustrated in FIG. 11 from a user interface perspective according to various embodiments.

Referring to FIG. 11, in operation 1110, the electronic device 101 according to an embodiment of the disclosure may obtain a first user input (e.g., a swipe gesture) to at least one icon (e.g., the first icon 310 as a widget).

In operation 1120, the electronic device 101 according to an embodiment of the disclosure may obtain a second user input (e.g., the sixth user input 1210) to at least one icon (e.g., the second icon 320) enlarged according to the obtained first user input.

In operation 1130, the electronic device 101 according to an embodiment of the disclosure may display a visual object (e.g., a visual object (e.g., a lock) indicating that the display position of at least one icon is fixed), based on a second user input (e.g., a sixth user input 1210).

In operation 1140, the electronic device 101 may obtain a third user input (e.g., the 6-1th user input 1220) to the visual object.

In operation 1150, the electronic device 101 may fix the display position of at least one enlarged icon, based on the third user input.

As illustrated in FIG. 12, the electronic device 101 according to an embodiment of the disclosure may fix the display position of the at least one enlarged icon together with a visual object (e.g., a lock) indicating that the display position of the at least one enlarged icon is fixed. In this case, the electronic device 101 according to an embodiment of the disclosure may not change the display position even if the user's movement command for at least one enlarged icon (e.g., the second icon 320) is obtained.

Figure 13:
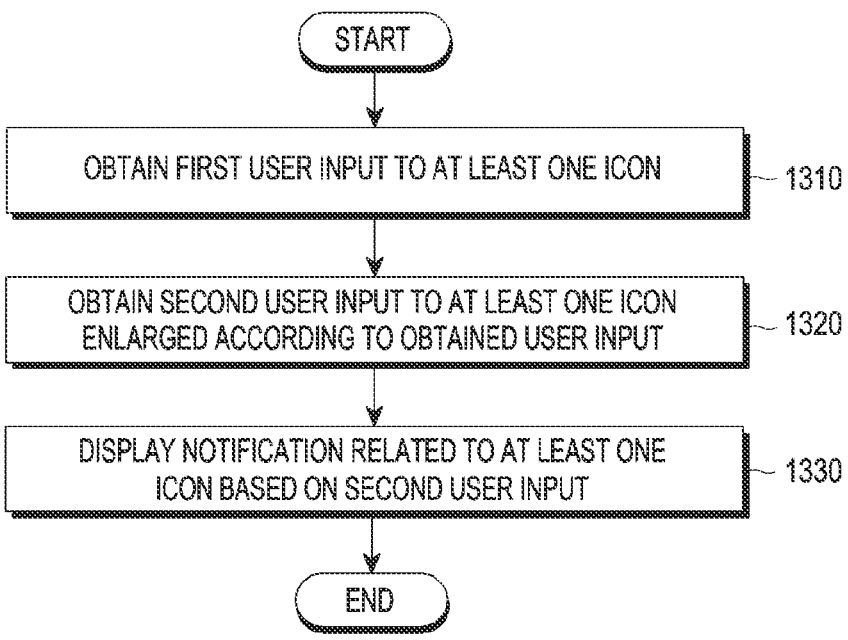
FIG. 13 is a flowchart illustrating an example operation in which an electronic device moves a visual object (e.g., icon) whose shape is changed or displays notification content according to a user input to the shape changed visual object (e.g., icon) based on a user input according to various embodiments.
Figure 14:
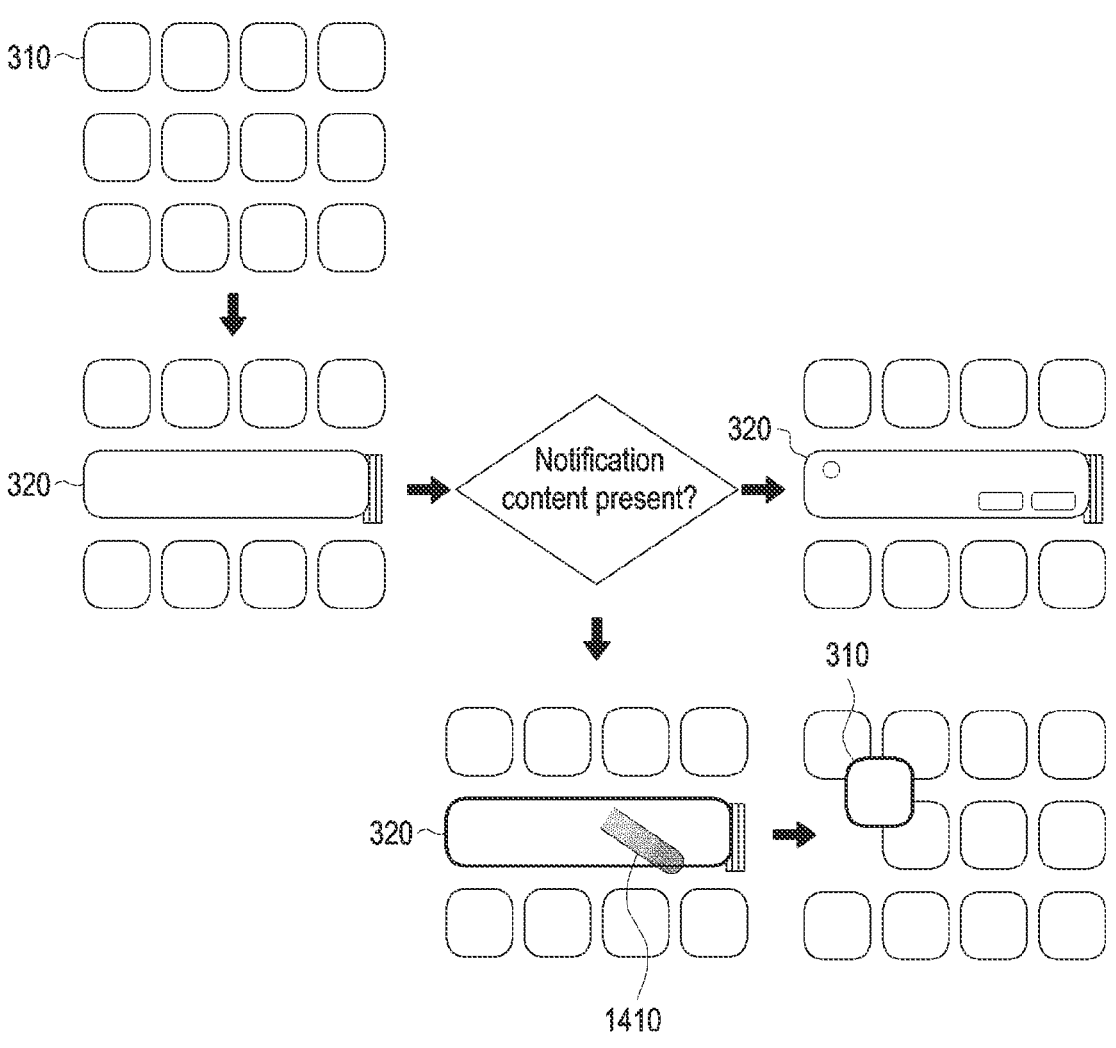
FIG. 14 is a diagram illustrating the example function or operation illustrated in FIG. 13 from a user interface perspective according to various embodiments.

FIG. 13 is a flowchart illustrating an example operation in which an electronic device 101 moves an icon whose shape is changed or displays notification content according to a user input to the shape changed icon based on a user input according to various embodiments. FIG. 14 is a diagram illustrating the example function or operation illustrated in FIG. 13 from a user interface perspective according to various embodiments.

Referring to FIG. 13, in operation 1310, the electronic device 101 according to an embodiment of the disclosure may obtain a first user input (e.g., a swipe gesture) to at least one icon (e.g., the first icon 310).

In operation 1320, the electronic device 101 according to an embodiment of the disclosure may obtain a second user input to at least one icon (e.g., the second icon 320) enlarged according to the obtained first user input.

In operation 1330, the electronic device 101 according to an embodiment of the disclosure may display a notification related to at least one icon, based on the second user input.

As illustrated in FIG. 14, when a user input to the second icon 320 is obtained, and if there is a notification related to the second icon 320, the electronic device 101 according to an embodiment of the disclosure may display the content of the notification inside the second icon 320. When a user input to the second icon 320 is obtained, and if there is no notification related to the second icon 320, the electronic device 101 according to an embodiment of the disclosure may change the shape of the second icon 320 to the shape of the first icon 310 based on a user input to the second icon 320 (e.g., the seventh user input 1410). In this case, the electronic device 101 according to an embodiment of the disclosure may change the position of the first icon 310 according to a user input to the first icon 310. The first icon 310 according to an embodiment of the disclosure may be displayed in a floating state.

Figure 15:
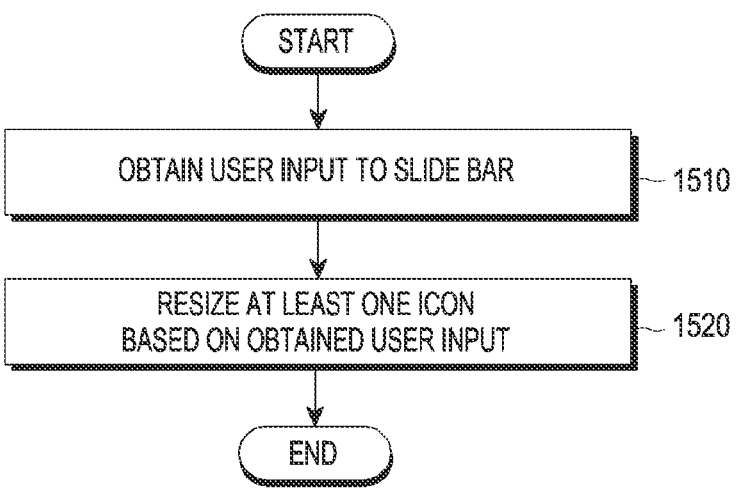
FIG. 15 is a flowchart illustrating an example operation in which an electronic device changes the size of a visual object (e.g., icon) according to a user input to a slide bar configured to change the shape of at least one visual object (e.g., icon) according to various embodiments.
Figure 16:
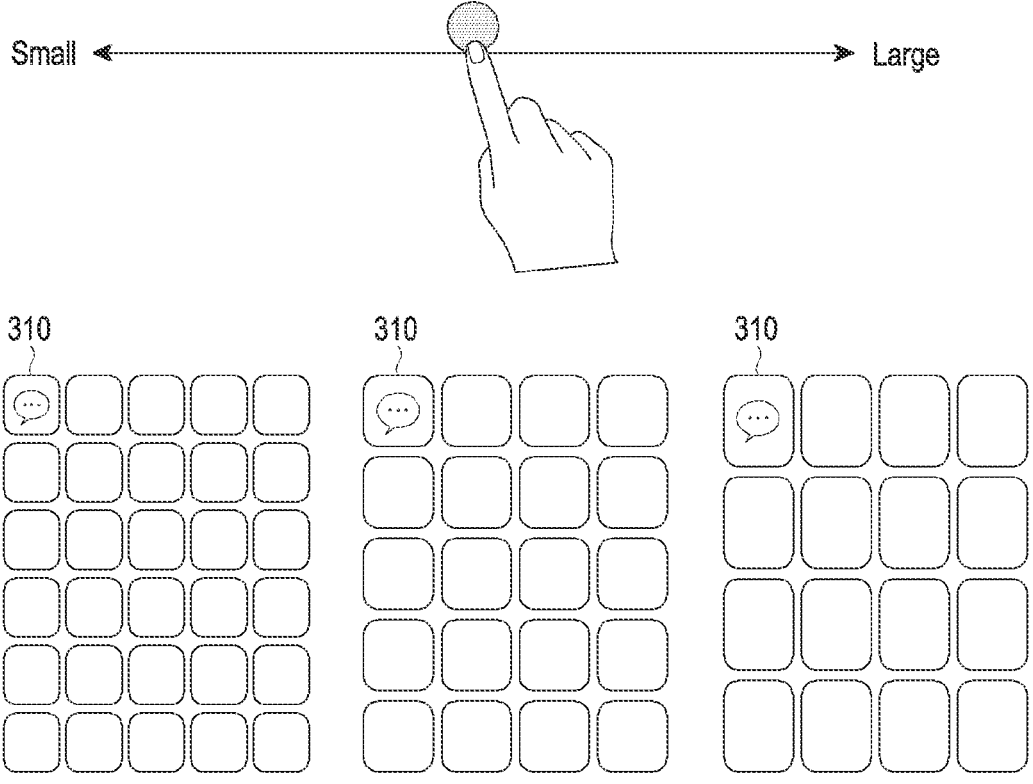
FIG. 16 is a diagram illustrating the example function or operation illustrated in FIG. 15 from a user interface perspective according to various embodiments.

FIG. 15 is a flowchart illustrating an example operation in which an electronic device changes the size of an icon according to a user input to a slide bar configured to change the shape of at least one icon (e.g., the first icon 310) according to various embodiments. FIG. 16 is a diagram illustrating the example function or operation illustrated in FIG. 15 from a user interface perspective according to various embodiments.

Referring to FIG. 15, in operation 1510, the electronic device 101 according to an embodiment of the disclosure may obtain a user input to a slide bar. The slide bar according to an embodiment of the disclosure may be displayed on a screen for editing a home screen.

In operation 1520, the electronic device 101 according to an embodiment of the disclosure may reshape (e.g., resize) at least one icon (e.g., the first icon 310), based on the obtained user input.

As illustrated in FIG. 16, when a user input is obtained in a Large direction, the electronic device 101 according to an embodiment of the disclosure may enlarge at least some of the icons displayed on the home screen. As another example, when a user input is obtained in a Small direction, at least some of the icons displayed on the home screen may be shrunken.

Figure 17A:
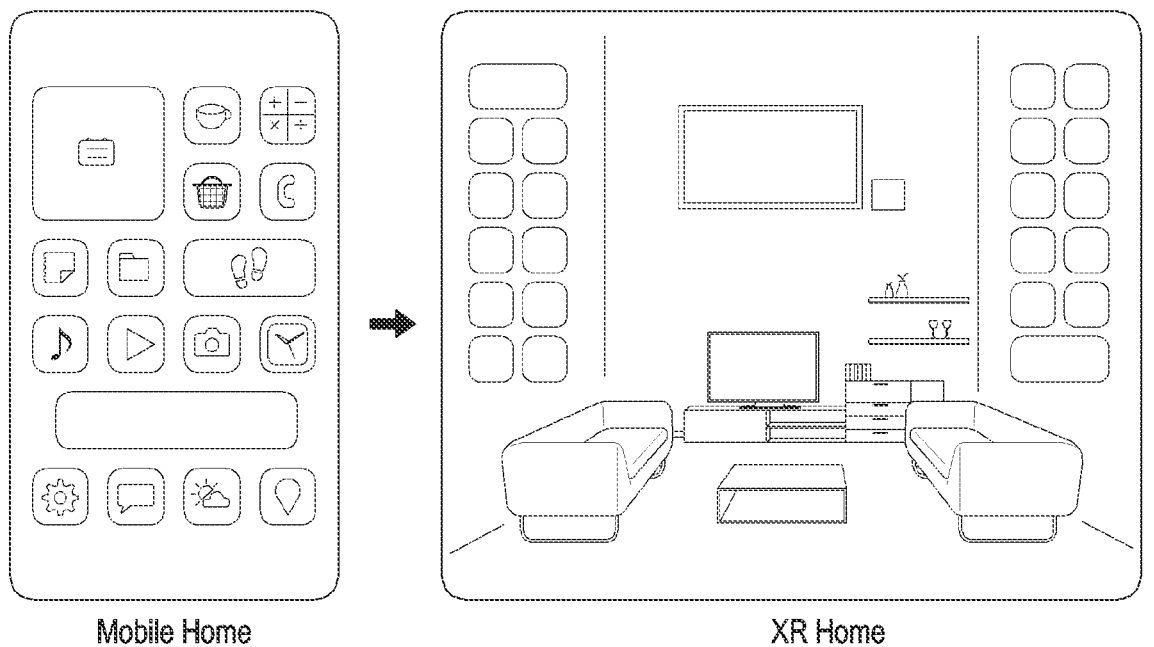
FIGS. 17A and 17B are diagrams illustrating an example function or operation in which a screen configuration is applied in substantially the same manner to at least one external electronic device operably connected to an electronic device according to various embodiments.
Figure 17B:
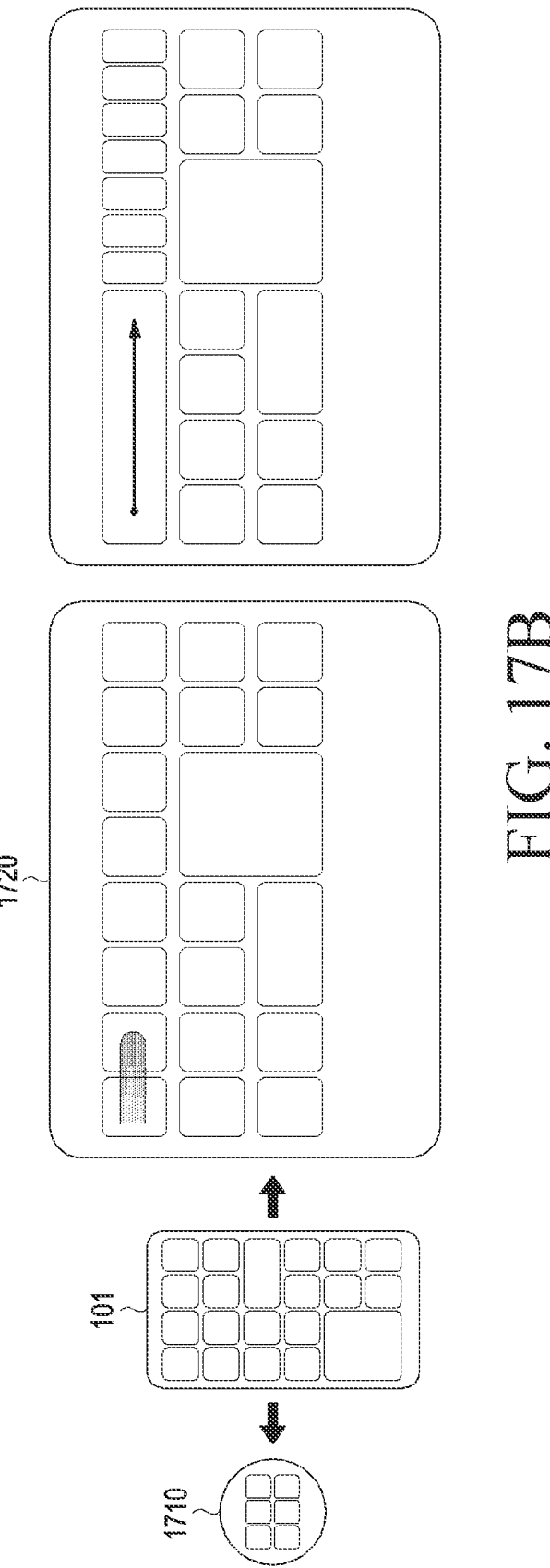

FIGS. 17A and 17B are diagrams illustrating an example operation in which a screen configuration is applied in substantially the same manner to at least one external electronic device operably connected to an electronic device 101 according to various embodiments.

Referring to FIGS. 17A and 17B, an icon enlarged according to an embodiment of the disclosure may be provided to the user in substantially the same manner through at least one external electronic device (e.g., a glasses-type wearable device, a watch 1710, or a tablet 1720 configured to provide augmented reality) operably connected to the electronic device 101. When a user input for reconfiguring a screen is obtained through at least one external electronic device (e.g., a glasses-type wearable device, the watch 1710, or the tablet 1720 configured to provide augmented reality), the electronic device 101 according to an embodiment of the disclosure may share the result of the reconfigured screen with another device. Accordingly, the screen configuration according to an embodiment of the disclosure may be substantially identically applied to at least one external electronic device operatively connected to the electronic device 101.

Figure 18:
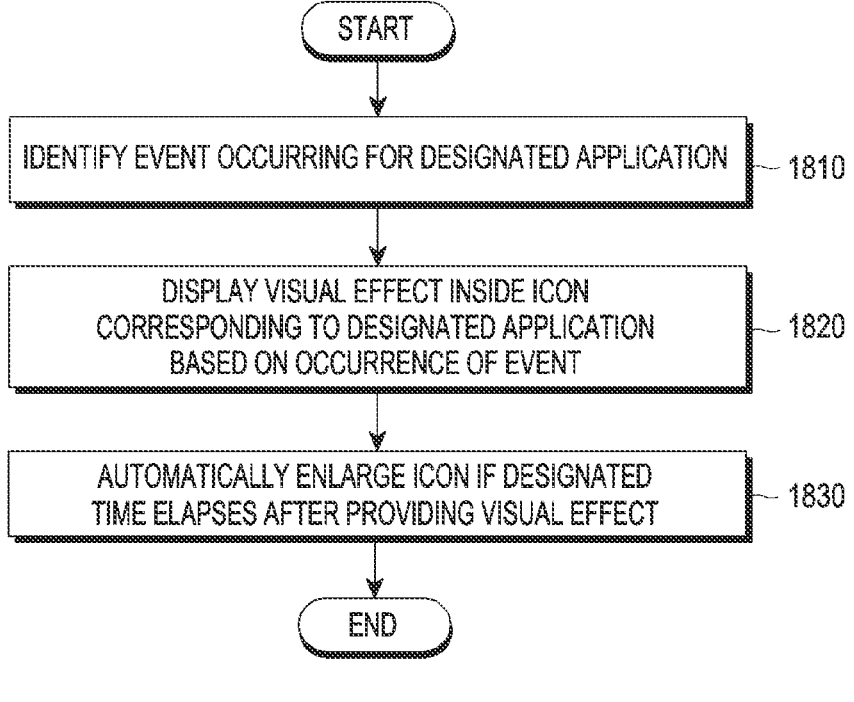
FIG. 18 is a flowchart illustrating an example operation in which an electronic device automatically extends an icon based on an event that occurs on a designated application according to various embodiments.
Figures 19A, 19B:
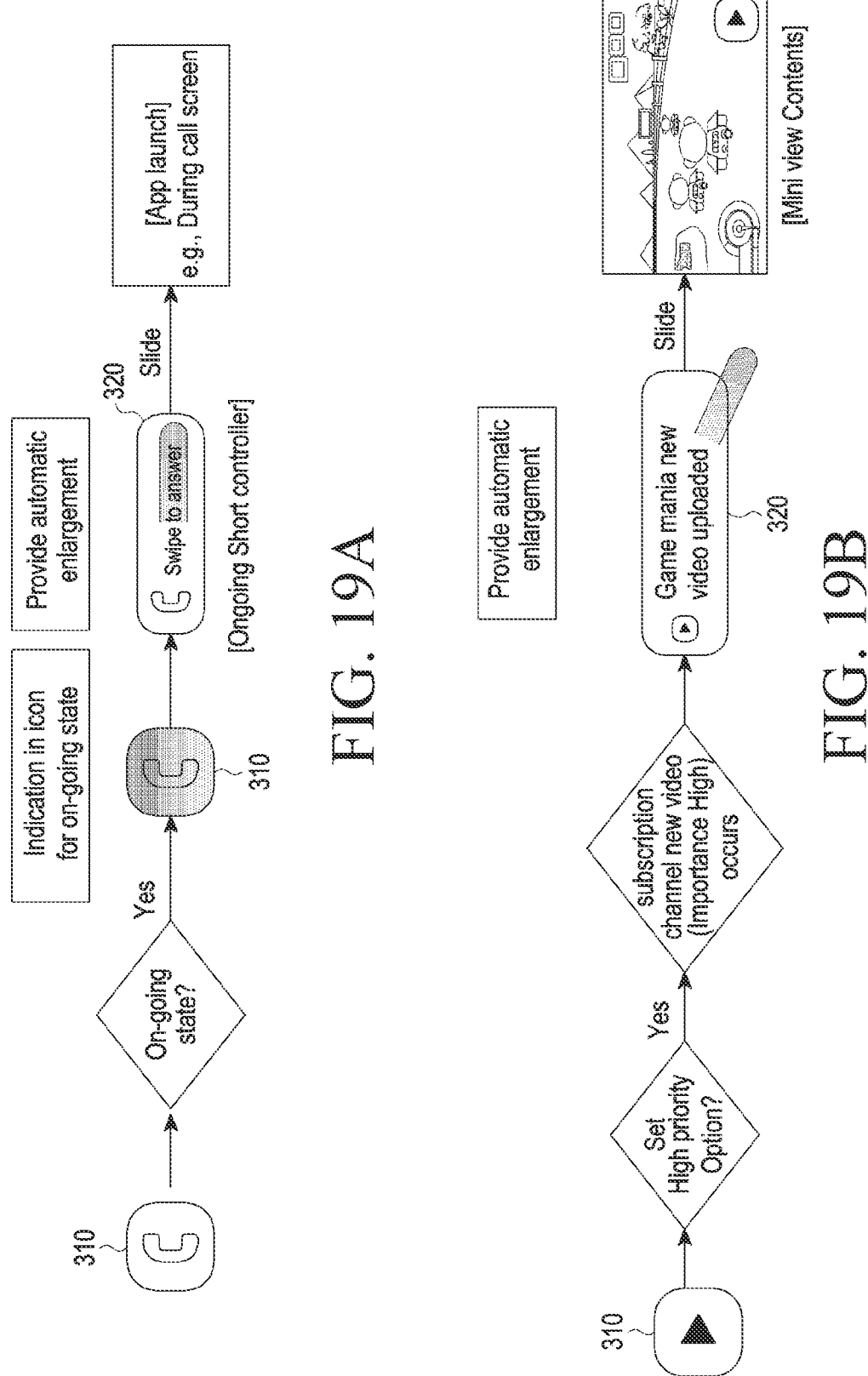
FIGS. 19A and 19B are diagrams illustrating the example function or operation illustrated in FIG. 18 from a user interface perspective according to various embodiments.

FIG. 18 is a flowchart illustrating an example operation in which an electronic device 101 automatically extends an icon based on an event that occurs on a designated application according to various embodiments. FIGS. 19A and 19B are diagrams illustrating the example function or operation illustrated in FIG. 18 from a user interface perspective according to various embodiments.

Referring to FIG. 18, in operation 1810, the electronic device 101 according to an embodiment of the disclosure may identify an event occurring for a designated application (e.g., a call application).

In operation 1820, based on the occurrence of the event, the electronic device 101 may display a visual effect inside an icon (e.g., the first icon 310) corresponding to the designated application (e.g., a call application) as illustrated in FIG. 19A. The event according to an embodiment of the disclosure may include a call reception event and/or a subscription channel new video generation event.

In operation 1830, when a designated time elapses after providing the visual effect, the electronic device 101 may automatically enlarge and display the icon. According to an embodiment of the disclosure, as illustrated in FIG. 19B, when the occurrence of an event is identified, an icon may be enlarged and displayed within a designated time without providing a visual effect.

Figure 19C:
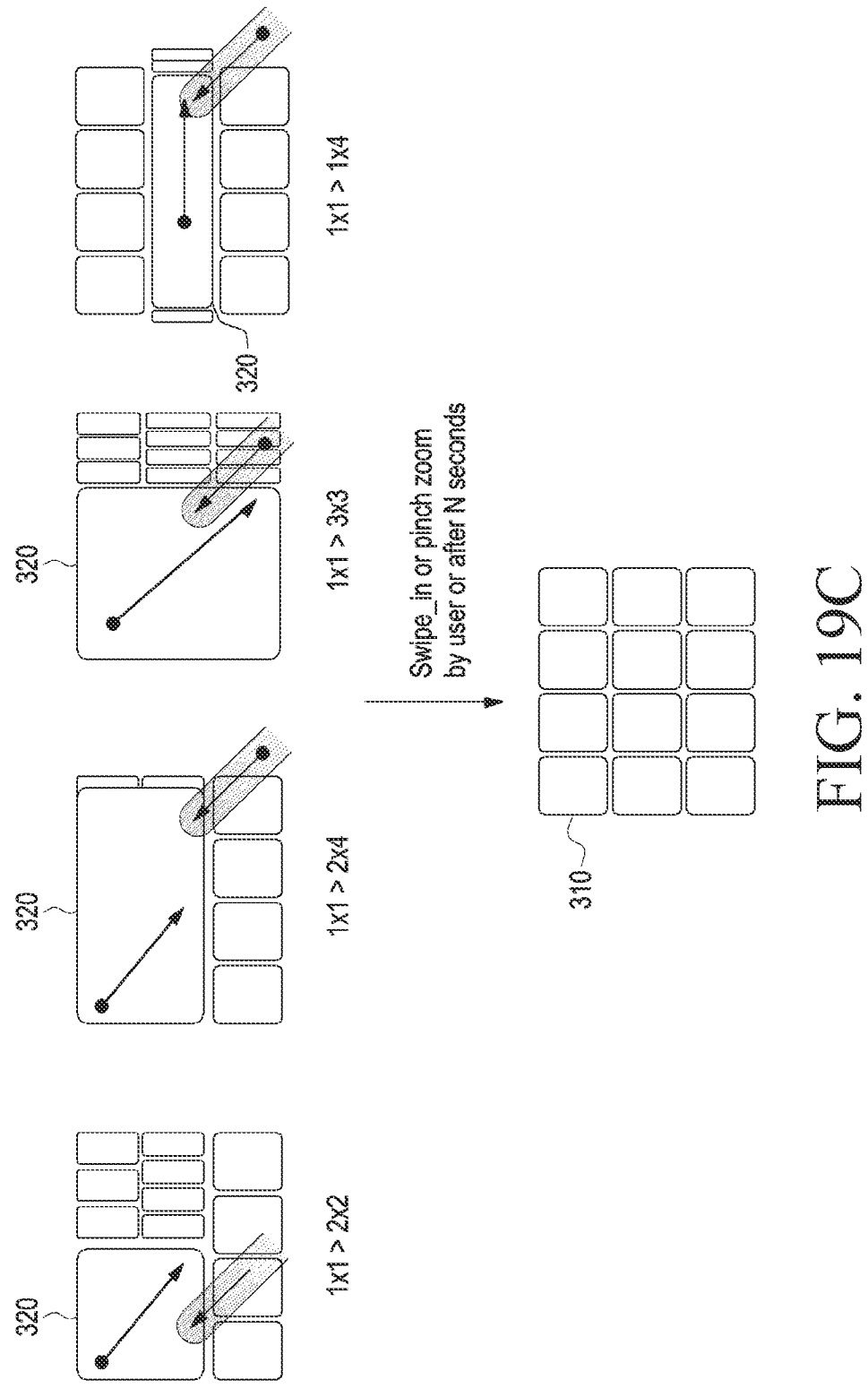
FIG. 19C is a diagram illustrating an example function or operation of automatically shrinking an extended object (e.g., the second icon) over time or according to the user's input according to various embodiments.

FIG. 19C is a diagram illustrating an example function or operation of automatically shrinking an extended object (e.g., the second icon 320) over time or according to the user's input according to various embodiments. As illustrated in FIG. 19C, the electronic device 101 according to an embodiment of the disclosure may display an icon (e.g., the second icon 320) in the enlarged state as an icon (e.g., the first icon) in the shrunken state when a user input in a direction opposite to the enlarged direction is obtained or when it is identified that a designated time elapses after enlarged.

Figure 20:
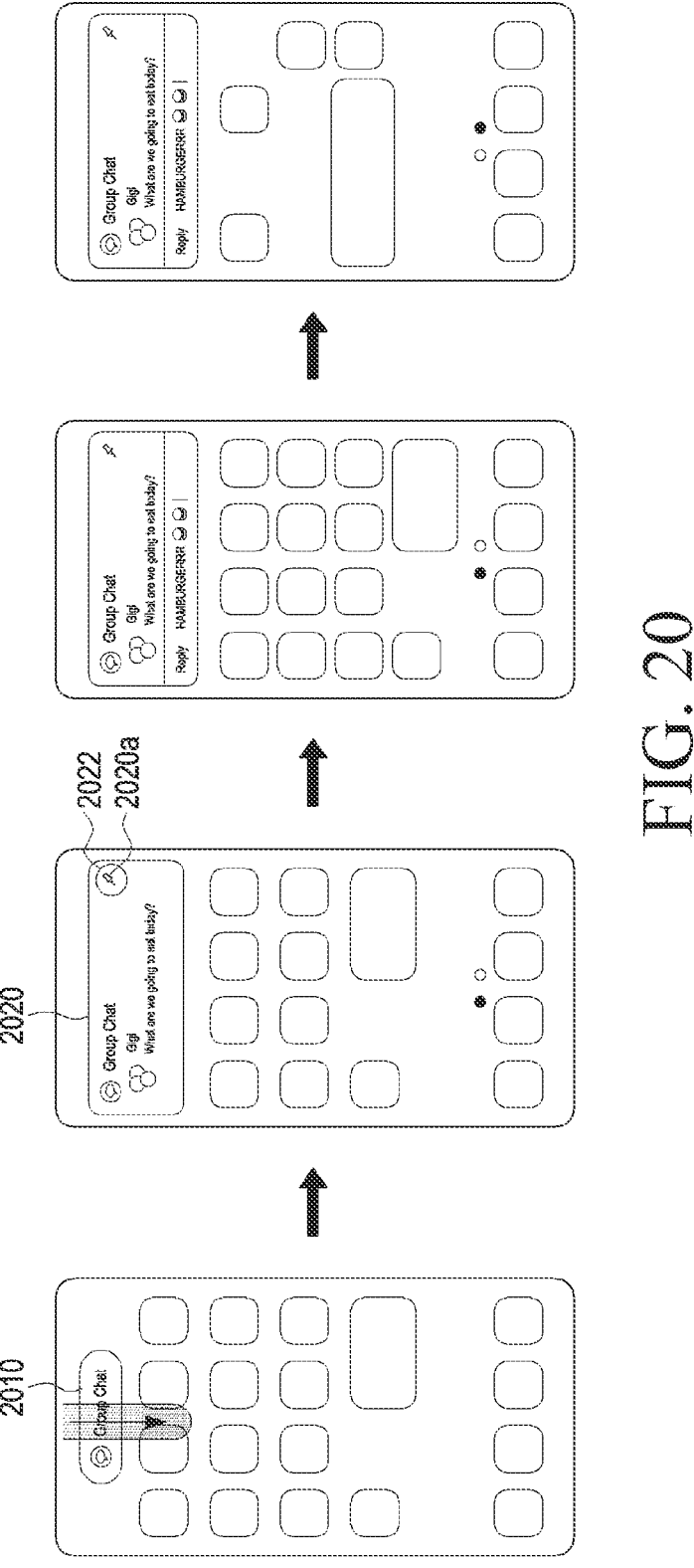
FIGS. 20 and 21 are diagrams illustrating an example function or operation in which an electronic device fixes and displays a notification card according to various embodiments.
Figure 21:
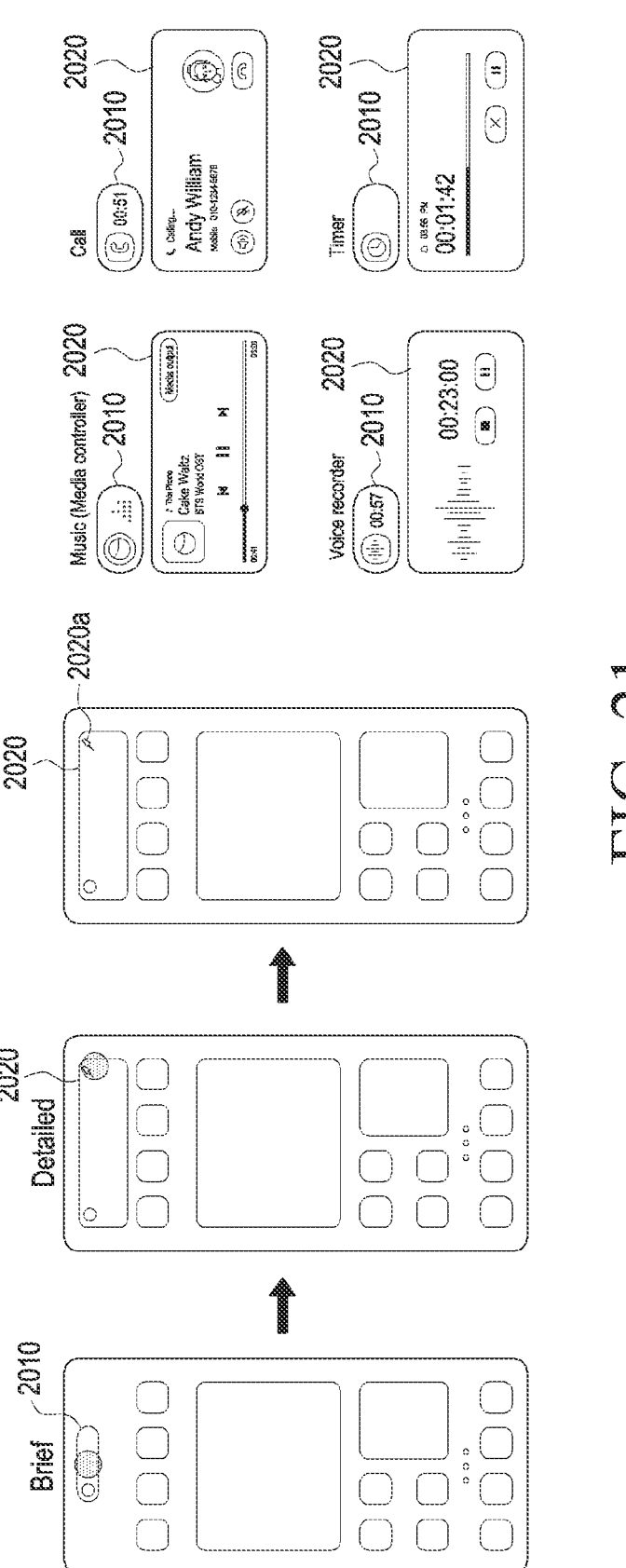

FIGS. 20 and 21 are diagrams illustrating an example function or operation in which an electronic device 101 fixes and displays a notification card according to various embodiments.

Referring to FIG. 20, the electronic device 101 according to an embodiment of the disclosure may obtain a user input (e.g., a swipe gesture) for a notification (e.g., the first notification 2010) in a first state. The electronic device 101 may extend and display the notification in the first state to a notification in a second state (e.g., the second notification 2020) based on obtaining the user input. The notification in the second state according to an embodiment of the disclosure may include a visual element 2020a for fixing the display position of the notification in the second state. The electronic device 101 according to an embodiment of the disclosure may obtain a user touch input 2022 to the visual element 2020a. The electronic device 101 may re-align display positions of icons being displayed on a screen (e.g., a home screen), based on obtaining the user touch input 2022. The electronic device 101 according to an embodiment of the disclosure may re-align the icons so as not to overlap, e.g., the second notification 2020. As illustrated in FIG. 20, the electronic device 101 according to an embodiment of the disclosure may obtain a user input for scrolling the home screen. In this case, even if the home screen is scrolled, the electronic device 101 may display a new home screen such that at least one icon included in the newly displayed home screen does not overlap the notification (e.g., the second notification 2020) in the second state. According to an embodiment of the disclosure, the position-fixed second notification 2020 may be continuously displayed on the electronic device 101 even when the home screen is switched.

As illustrated in FIG. 21, the notification (e.g., the second notification 2020) in the second state may include more information than the notification (e.g., the first notification 2010) in the first state. For example, the first notification 2010 according to an embodiment of the disclosure may include only the playback time of the media, but the second notification 2020 may further include not only the playback time but also an icon for pausing the media being played.

Figure 22:
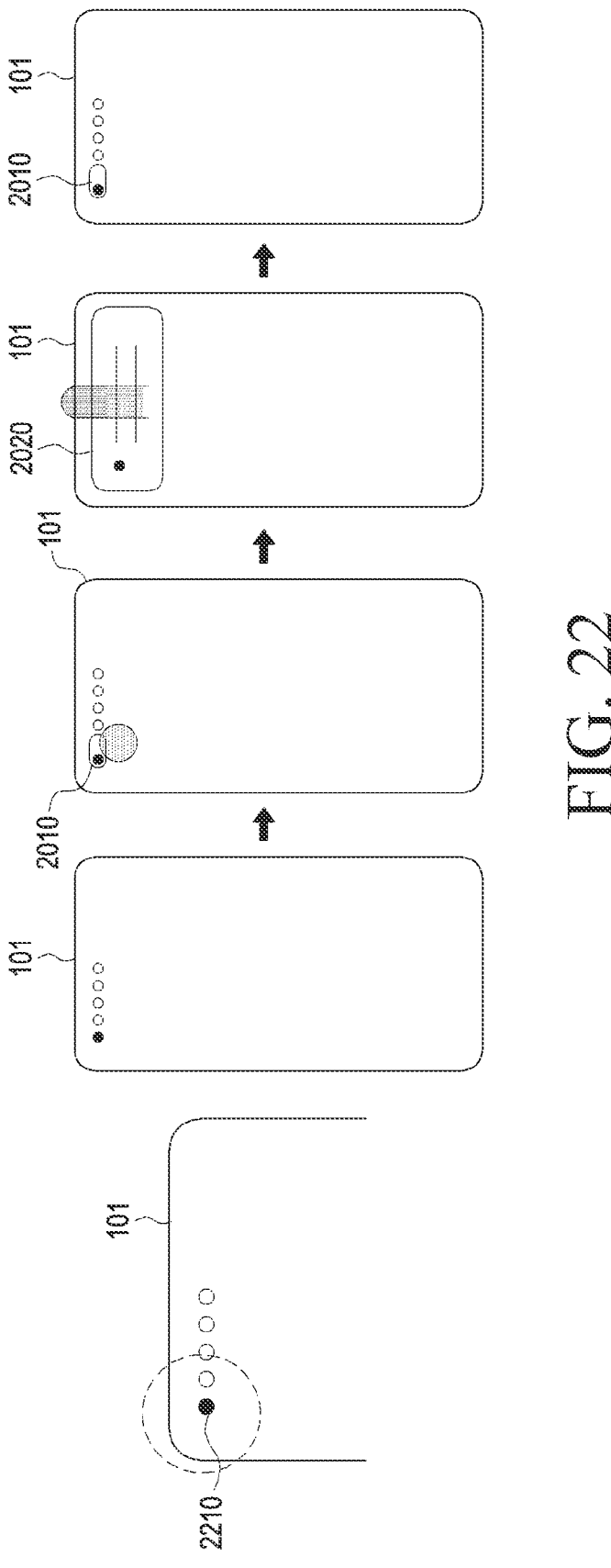
FIGS. 22, 23 and 24 are diagrams illustrating various states of a notification, from a user interface perspective according to various embodiments.
Figure 23:
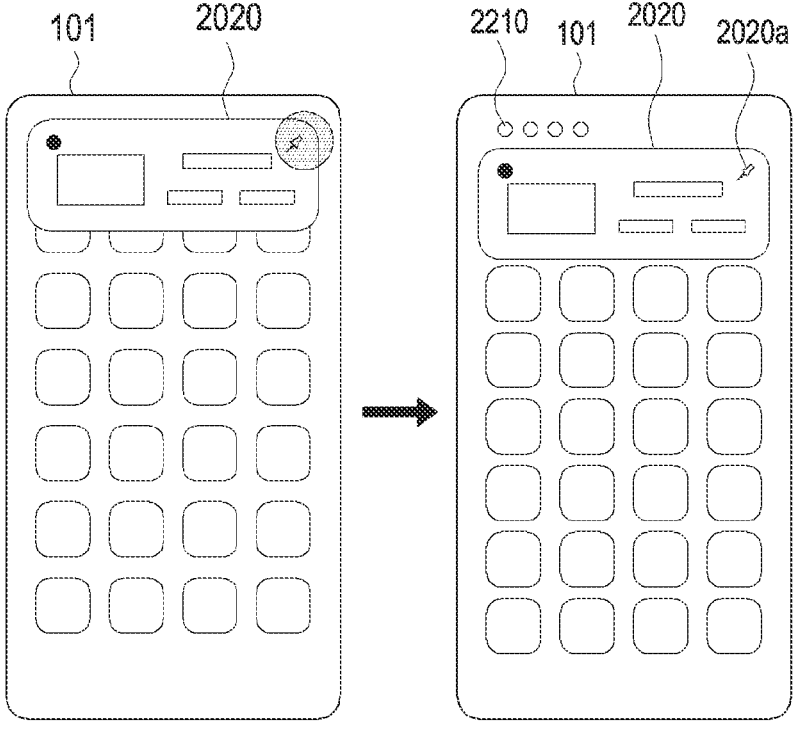
Figure 24:
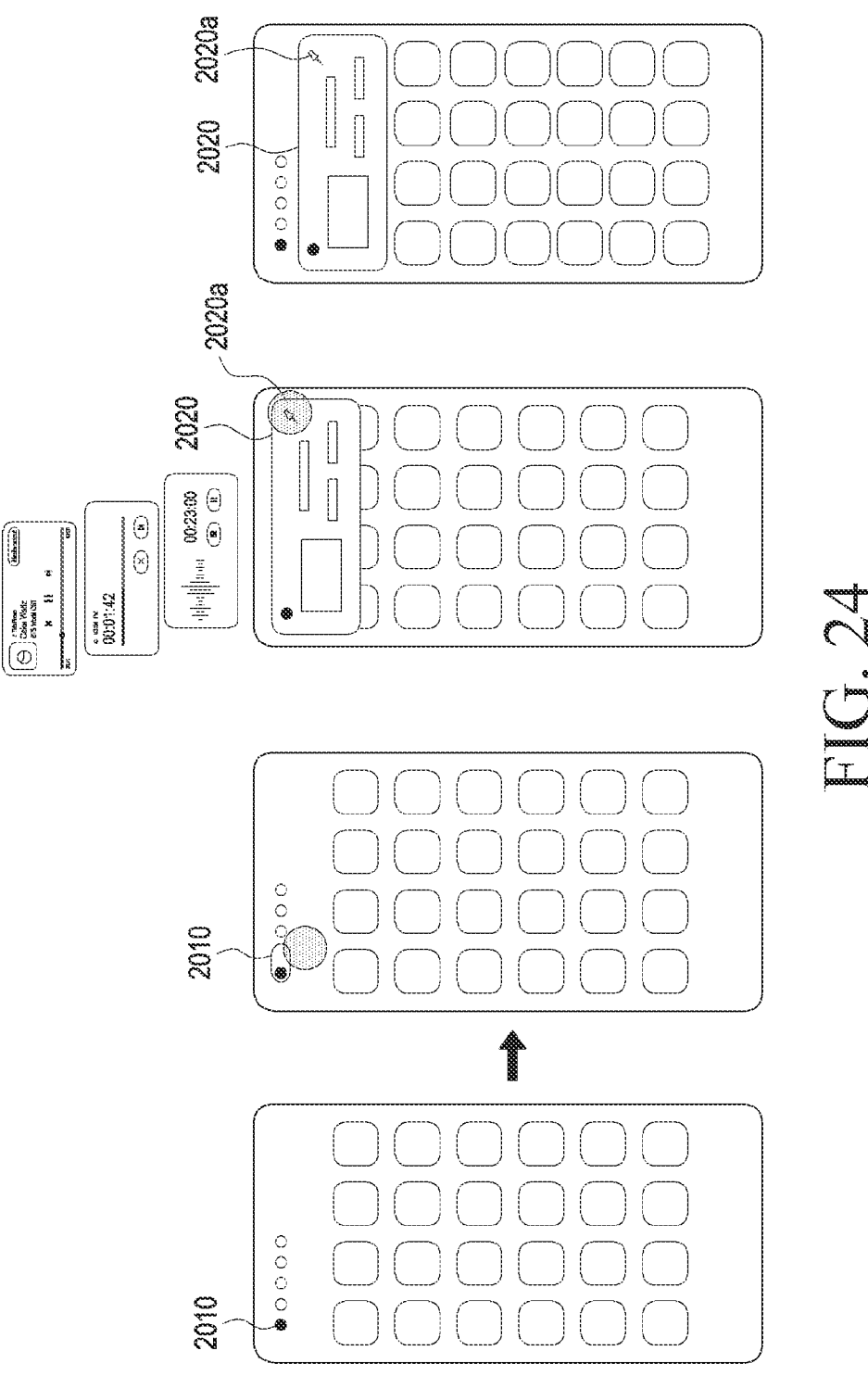

FIGS. 22, 23 and 24 are diagrams illustrating various example states of a notification from a user interface perspective according to various embodiments.

Referring to FIG. 22, a notification according to an embodiment of the disclosure may be reduced to a circular shape on a designated screen (e.g., a home screen) and displayed (e.g., a third notification 2210). When an event occurs for a designated application (e.g., a music application), the electronic device 101 according to an embodiment of the disclosure may enlarge the indicator to a designated size as illustrated in FIG. 22 and display information (e.g., the playback time of the media played through the music application) related to the occurring event. When a user input is obtained for an enlarged notification (e.g., the first notification 2010), the electronic device 101 according to an embodiment of the disclosure may further enlarge (e.g., the second notification 2020) the enlarged notification (e.g., the first notification 2010) to display more information related to the designated application. When a user input to the further enlarged notification (e.g., the second notification 2020) is obtained, the electronic device 101 according to an embodiment of the disclosure may shrink and display the notification (e.g., the first notification 2010).

Referring to FIGS. 23 and 24, when a user input for fixing the display position of the further enlarged notification (e.g., the second notification 2020) is obtained, the electronic device 101 according to an embodiment of the disclosure may display the further enlarged notification (e.g., the second notification 2020) along with the remaining shrunken notification (e.g., the third notification 2210). In this case, the further enlarged notification (e.g., the second notification 2020) may not overlap the icons displayed on the screen.

Figure 25:
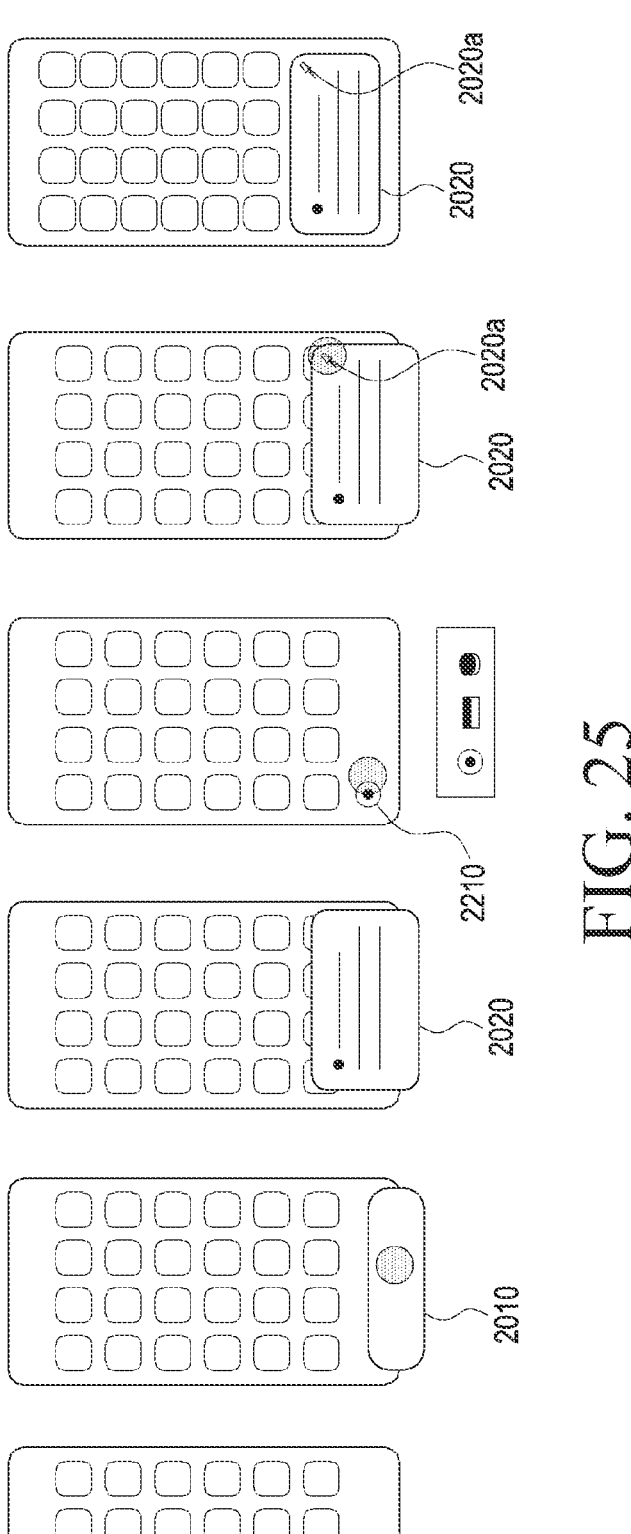
FIG. 25 is a diagram illustrating an example function or operation of displaying a notification, with the display position of the notification fixed, when a notification related to a designated application is provided at a lower portion of a screen, from a user interface perspective according to various embodiments.
Figure 26:
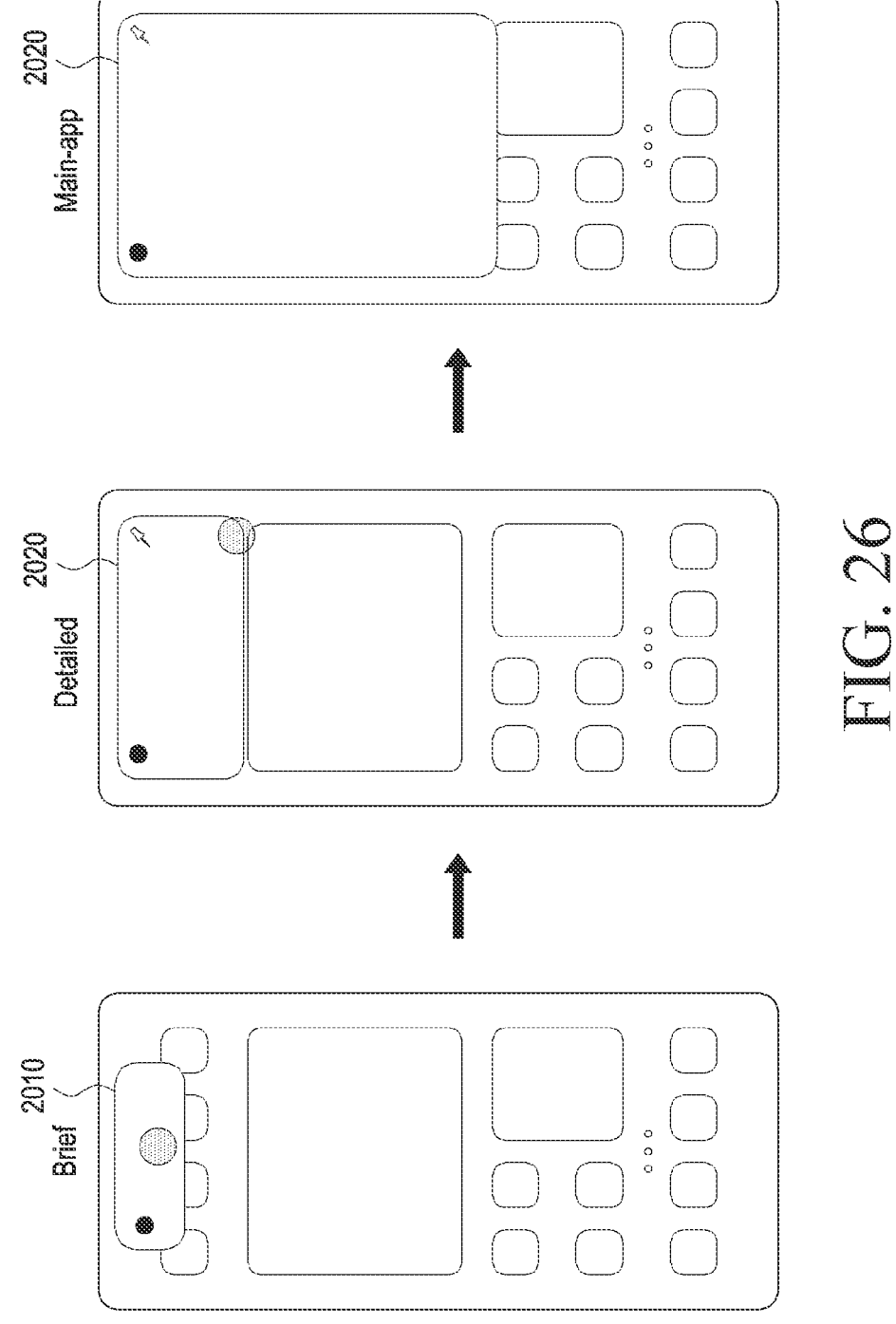
FIG. 26 is a diagram illustrating an example function or operation of adjusting the size of a displayed notification according to a user interface and displaying the notification according to various embodiments.

FIG. 25 is a diagram illustrating an example function or operation of displaying a notification, with the display position of the notification fixed, when a notification related to a designated application is provided at a lower portion of a screen, from a user interface perspective according to various embodiments. FIG. 26 is a diagram illustrating an example function or operation of adjusting the size of a displayed notification according to a user interface and displaying the notification according to various embodiments.

Referring to FIG. 25, when an event occurs for a designated application, the electronic device 101 according to an embodiment of the disclosure may provide a notification (e.g., the second notification 2020) in a direction from the bottom to the top of the screen. The electronic device 101 according to an embodiment of the disclosure may reshape the notification to a shrunken notification (e.g., the third notification 2210) when a user input to the notification (e.g., the second notification 2020) is obtained or when a designated time elapses after the notification (e.g., the second notification 2020) is displayed. When a user input (e.g., a touch input) to the shrunken notification (e.g., the third notification 2210) is obtained, the electronic device 101 according to an embodiment of the disclosure may change the shape of the notification to a further enlarged notification (e.g., the second notification 2020). When a user input to the visual object 2020a included in the further enlarged notification (e.g., the second notification 2020) is obtained, the electronic device 101 may fix the display position of the second notification 2020 at the position where the second notification 2020 is currently displayed (e.g., at a lower portion of the screen of the electronic device 101). When the display position is fixed, the electronic device 101 according to an embodiment of the disclosure may display the notification not to overlap other objects included in the screen at the fixed display position although the screen switches.

Referring to FIG. 26, according to a user input to the notification, the notification may be resized and displayed. In this case, more information related to the designated application may be displayed than in the shrunken notification.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a touchscreen display; and
   at least one processor, comprising processing circuitry, and memory storing instructions that, when executed by the at least one processor, cause the electronic device to:
   display, on the touchscreen display, a first screen including a plurality of visual objects;

obtain a first input to at least one visual object among the visual objects, through the touchscreen display; and shrink and display other visual objects among the plurality of visual objects while enlarging the at least one visual object, through the touchscreen display, based on obtaining the first input, wherein the other visual objects are shrunken and displayed without overlapping as the at least one visual object is enlarged.

2. The electronic device of claim 1, wherein the instructions further include an instruction that, when executed by the at least one processor, cause the electronic device to apply a designated visual effect to the at least one visual object based on detecting an occurrence of an event related to the at least one visual object.

3. The electronic device of claim 2, wherein the instructions further include an instruction that, when executed by the at least one processor, cause the electronic device to display information related to the event on the enlarged at least one visual object based on obtaining a second input to the designated visual effect-applied visual object.

4. The electronic device of claim 1, wherein the instructions further include an instruction that, when executed by the at least one processor, cause the electronic device to display an execution screen of a widget or an application corresponding to the visual object based on obtaining a third input to the enlarged at least one visual object.

5. The electronic device of claim 1, wherein the other visual objects include visual objects disposed in a direction in which the at least one visual object is enlarged.

6. The electronic device of claim 1, wherein the other visual objects are overlapped and displayed as the at least one visual object is enlarged.

7. The electronic device of claim 1, wherein shapes of the other visual objects are changed and a shape of the at least one visual object is changed based on obtaining the first input.

8. The electronic device of claim 1, wherein the instructions further include an instruction that, when executed by the at least one processor, cause the electronic device to, based on the at least one visual object being a widget, fix a display position of the enlarged at least one visual object based on obtaining a fourth input to the enlarged at least one visual object.

9. The electronic device of claim 1, wherein the instructions further include an instruction that, when executed by the at least one processor, cause the electronic device to, based on the at least one visual object not being a widget, display a notification related to the enlarged at least one visual object based on obtaining a fifth input to the enlarged at least one visual object.

10. The electronic device of claim 1, wherein the instructions further include an instruction that, when executed by the at least one processor, cause the electronic device to resize the plurality of visual objects based on obtaining a sixth input for resizing a visual object.

11. A method, comprising:

displaying, on a touchscreen display of an electronic device, a first screen including a plurality of visual objects;

obtaining a first input to at least one visual object among the plurality visual objects, through the touchscreen display; and shrinking and displaying other visual objects among the plurality of visual objects while enlarging the at least one visual object, through the touchscreen display, based on obtaining the first input, wherein the other visual objects are shrunken and displayed without overlapping as the at least one visual object is enlarged.

12. The method of claim 11, further comprising applying a designated visual effect to the at least one visual object based on detecting an occurrence of an event related to the at least one visual object.

13. The method of claim 12, further comprising displaying information related to the event on the enlarged at least one visual object based on obtaining a second input to the designated visual effect-applied visual object.

14. The method of claim 11, further comprising displaying an execution screen of a widget or an application corresponding to the visual object based on obtaining a third input to the enlarged at least one visual object.

15. The method of claim 11, wherein the other visual objects are visual objects disposed in a direction in which the at least one visual object is enlarged.

16. The method of claim 11, wherein the other visual objects are overlapped and displayed as the at least one visual object is enlarged.

17. The method of claim 11, wherein shapes of the other visual objects are changed and a shape of the at least one visual object is changed based on obtaining the first input.

18. The method of claim 11, further comprising, based on the at least one visual object being a widget, fixing a display position of the enlarged at least one visual object based on obtaining a fourth input to the enlarged at least one visual object.

19. The method of claim 11, further comprising, based on the at least one visual object not being a widget, displaying a notification related to the enlarged at least one visual object based on obtaining a fifth input to the enlarged at least one visual object.

20. The method of claim 11, further comprising resizing the plurality of visual objects based on obtaining a sixth input for resizing a visual object.

* * * * *